(12) United States Patent
Bradley et al.

(10) Patent No.: US 12,525,991 B1
(45) Date of Patent: Jan. 13, 2026

(54) SPARSE PATH CODES AND METHODS

(71) Applicant: Digimarc Corporation, Beaverton, OR (US)

(72) Inventors: Brett A. Bradley, Portland, OR (US); Nicholas Anderson, Colorado Springs, CO (US); William Y. Conwell, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 492 days.

(21) Appl. No.: 17/897,552

(22) Filed: Aug. 29, 2022

Related U.S. Application Data

(60) Provisional application No. 63/240,821, filed on Sep. 3, 2021.

(51) Int. Cl.
| | |
|---|---|
| *H03M 13/11* | (2006.01) |
| *G06T 7/70* | (2017.01) |
| *H03M 13/00* | (2006.01) |

(52) U.S. Cl.
CPC ........... *H03M 13/1111* (2013.01); *G06T 7/70* (2017.01); *H03M 13/611* (2013.01); *G06T 2207/20084* (2013.01); *G06T 2207/30204* (2013.01)

(58) Field of Classification Search
CPC ... H03M 13/1111; H03M 13/611; G06T 7/70; G06T 2207/20084; G06T 2207/30204
See application file for complete search history.

(56) References Cited

U.S. PATENT DOCUMENTS

| | | | | |
|---|---|---|---|---|
| 4,644,151 A | * | 2/1987 | Juvinall | ............... B07C 5/3408 235/494 |
| 5,301,238 A | * | 4/1994 | Apter | ................... B07C 5/3412 235/462.03 |
| 6,988,202 B1 | * | 1/2006 | Rhoads | ............. H04N 1/32154 713/181 |
| 7,621,459 B2 | | 11/2009 | Hovis | |
| 7,878,415 B2 | | 2/2011 | Hovis | |
| 8,517,281 B2 | | 8/2013 | Rupp | |
| 9,292,725 B2 | | 3/2016 | Salvi | |

(Continued)

FOREIGN PATENT DOCUMENTS

| | | | | |
|---|---|---|---|---|
| CN | 111144160 A | * | 5/2020 | ............... D06H 7/00 |
| WO | 0200068 | | 1/2002 | |
| WO | 2021078842 | | 4/2021 | |

OTHER PUBLICATIONS

Podilchuk et al., "Image-adaptive watermarking using visual models," in IEEE Journal on Selected Areas in Communications, vol. 16, No. 4, pp. 525-539, May 1998, doi: 10.1109/49.668975. (Year: 1998).*

(Continued)

*Primary Examiner* — Emily C Terrell
*Assistant Examiner* — Julia Z. Yao
(74) *Attorney, Agent, or Firm* — Klarquist Sparkman, LLP

(57) ABSTRACT

A series of marks and absences of marks (voids) arrayed along one or a few mathematically-defined paths, define a message-conveying sparse path code. Multiple improvements in the forms of such codes, and related encoding and reading techniques, are detailed. Some such improvements provide greatly increased robustness and decreased visibility. A variety of other features and arrangements are also detailed.

17 Claims, 18 Drawing Sheets

(56) References Cited

U.S. PATENT DOCUMENTS

| | | | | |
|---|---|---|---|---|
| 2001/0055407 | A1* | 12/2001 | Rhoads | H04N 19/467 |
| | | | | 704/E19.009 |
| 2013/0037619 | A1* | 2/2013 | Key | G09F 3/0297 |
| | | | | 235/487 |
| 2014/0060747 | A1* | 3/2014 | Friedlaender | B29B 17/02 |
| | | | | 156/701 |
| 2018/0345323 | A1 | 12/2018 | Kerver | |
| 2018/0345326 | A1* | 12/2018 | Tsutsumi | B08B 3/047 |
| 2019/0171856 | A1* | 6/2019 | Sharma | G06K 19/06103 |
| 2019/0306385 | A1 | 10/2019 | Sharma | |
| 2019/0351457 | A1* | 11/2019 | Kerver | G06K 19/06037 |
| 2021/0299706 | A1 | 9/2021 | Filler | |
| 2022/0004832 | A1* | 1/2022 | Doheny, II | G06K 19/06028 |
| 2022/0371055 | A1* | 11/2022 | Kerver | G06K 7/1443 |

OTHER PUBLICATIONS

Freeman et al., "Performance of a two-dimensional product code with soft-decision decoding," Proceedings of MILCOM '94, Fort Monmouth, NJ, USA, 1994, pp. 1032-1037 vol. 3, doi: 10.1109/MILCOM.1994.473958. (Year: 1994).*

Phadikar et al., "Region based QIM digital watermarking scheme for image database in DCT domain," in ScienceDirect Journal on Computers & Electrical Engineering, vol. 37, No. 3, pp. 339-555, 2011, doi: https://doi.org/10.1016/j.compeleceng.2011.02.002. (Year: 2011).*

Schlauweg et al., "Avoiding Hard Decisions in Adaptive Watermarking," 2007 IEEE International Conference on Image Processing, San Antonio, TX, USA, 2007, pp. IV-453-IV-456, doi: 10.1109/ICIP.2007.4380052. (Year: 2007).*

Viterbi, "Error bounds for convolutional codes and an asymptotically optimum decoding algorithm," in IEEE Transactions on Information Theory, vol. 13, No. 2, pp. 260-269, Apr. 1967, doi: 10.1109/TIT.1967.1054010. (Year: 1967).*

Thomos et al., "List Viterbi decoding of convolutional codes for efficient data hiding," Proceedings. International Conference on Image Processing, Rochester, NY, USA, 2002, pp. III-III, doi: 10.1109/ICIP.2002.1039005. (Year: 2002).*

Hernandez et al., "Improving data hiding by using convolutional codes and soft-decision decoding", Proc. SPIE 3971, Security and Watermarking of Multimedia Contents II, (May 9, 2000); https://doi.org/10.1117/12.384985 (Year: 2000).*

Lucas et al., "On iterative soft-decision decoding of linear binary block codes and product codes," in IEEE Journal on Selected Areas in Communications, vol. 16, No. 2, pp. 276-296, Feb. 1998, doi: 10.1109/49.661116. (Year: 1998).*

The Spot Platform powered by Google Pay, 2019.

* cited by examiner

|  -1 | -1 | -1 |
|---|---|---|
| -1 | 8  | -1 |
| -1 | -1 | -1 |

FIG. 5A

| 0  | -1 | 0  |
|---|---|---|
| -1 | 4  | -1 |
| 0  | -1 | 0  |

FIG. 5B

| 1 | 2   | 1 |
|---|---|---|
| 2 | -12 | 2 |
| 1 | 2   | 1 |

FIG. 5C

| -1 | -1 | -1 | -1 | -1 |
|---|---|---|---|---|
| -1 | 0  | 0  | 0  | -1 |
| -1 | 0  | 16 | 0  | -1 |
| -1 | 0  | 0  | 0  | -1 |
| -1 | -1 | -1 | -1 | -1 |

FIG. 5D

|   |   |   |   |   |   |   |   |   |
|---|---|---|---|---|---|---|---|---|
| 0  | -1 | -1 | -1 | -1 | -1 | -1 | -1 | 0  |
| -1 | -1 | -1 | -1 | -1 | -1 | -1 | -1 | -1 |
| -1 | -1 | -1 | -1 | -1 | -1 | -1 | -1 | -1 |
| -1 | -1 | -1 | 0  | 13 | 0  | -1 | -1 | -1 |
| -1 | -1 | -1 | 13 | 16 | 13 | -1 | -1 | -1 |
| -1 | -1 | -1 | 0  | 13 | 0  | -1 | -1 | -1 |
| -1 | -1 | -1 | -1 | -1 | -1 | -1 | -1 | -1 |
| -1 | -1 | -1 | -1 | -1 | -1 | -1 | -1 | -1 |
| 0  | -1 | -1 | -1 | -1 | -1 | -1 | -1 | 0  |

FIG. 6

|   |   |   |   |   |   |   |   |
|---|---|---|---|---|---|---|---|
| -1 | -1 | -1 | -1 | -1 | -1 | -1 | -1 |
| -1 | -1 | -1 | -1 | -1 | -1 | -1 | -1 |
| -1 | -1 | -1 | -1 | -1 | -1 | -1 | -1 |
| -1 | -1 | -1 | 15 | 15 | -1 | -1 | -1 |
| -1 | -1 | -1 | 15 | 15 | -1 | -1 | -1 |
| -1 | -1 | -1 | -1 | -1 | -1 | -1 | -1 |
| -1 | -1 | -1 | -1 | -1 | -1 | -1 | -1 |
| -1 | -1 | -1 | -1 | -1 | -1 | -1 | -1 |

FIG. 7

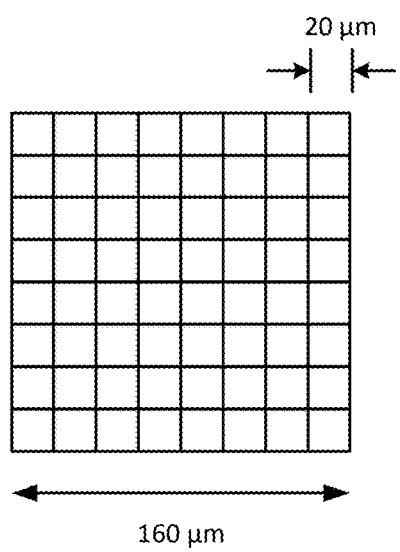
FIG. 23
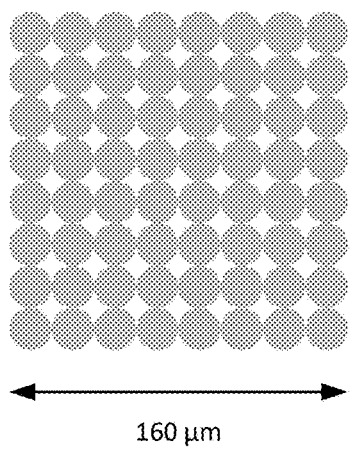 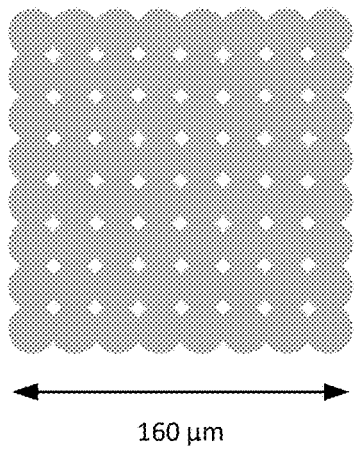 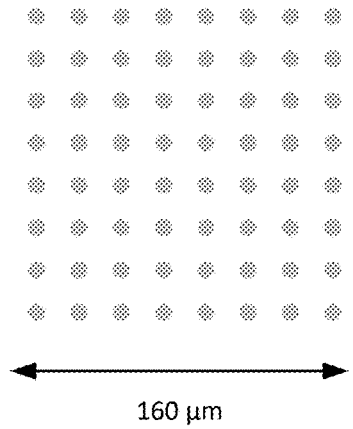
FIG. 24A  FIG. 24B  FIG. 24C

160 μm

160 μm

160 μm

160 μm

160 μm

160 μm

160 μm

160 μm

SPARSE PATH CODES AND METHODS

RELATED APPLICATION DATA

This application claims priority to provisional application 63/240,821, filed Sep. 3, 2021.

The subject matter of the present application is related to that detailed in applicant's patent publications US 20190306385, 20210299706, 20210387399 and 20210390358, and copending U.S. application Ser. No. 16/944,136, filed Jul. 30, 2020, Ser. No. 17/721,694, filed Apr. 15, 2022, and Ser. No. 17/835,775, filed Jun. 8, 2022.

The subject matter of the present application is also related to that disclosed in patent publications US20180345323 and WO2021078842 to Kerver et al.

The above-cited documents are incorporated herein by reference. The disclosure of the present application should be understood to expressly teach incorporation of the below-detailed features, principles and arrangements into the systems and methods disclosed in the above-cited documents.

INTRODUCTION

Publication WO2021078842 discloses what may be termed a sparse path code. Data is represented in such a code by dots, or absences of dots (voids), at spaced-apart marking locations. The code includes a start code, a mid-portion, and a stop code, which follow successively along a path (which may be straight or Bezier-curved).

The start code is described as the pattern "ddndn" where "d" indicates a dot and "n" indicates the absence of a dot. The stop code is the start code backwards, i.e., "ndndd." Both the start and stop codes may be regarded as sync codes.

The mid-portion of the code is described as occupying 14 dot locations, although applicant understands that 18 dot locations can be used in other implementations. This part of the code may be termed the "message" portion. (The information conveyed in the message portion may be termed the message. In applicant's preferred arrangements the message is encoded payload data.) In some of the discussion that follows, we use the letter "J" to reference the number of dot locations that are available in the message portion.

In one embodiment, the message portion is used to convey an identification code for a plastic item marked by the code. In a particular embodiment, the message portion conveys this identification code twice, in duplicate between the start code and the stop code. That is, the identification code is expressed once between the start code and the midpoint of the code. And the identification code is expressed a second time, in reversed form, between the midpoint and the stop code. Such arrangement provides redundancy, which is said to enable checking that the identification code has been read correctly, by comparing the reversed duplicates.

It will be understood that publication WO2021078842 does not teach "encoding" of payload data to yield bits conveyed in the message portion, as the term "encoding" is commonly used. The information to be conveyed by the sparse path code is understood to be literally expressed by the bits of the message portion, either twice (in the just-noted case of redundant expression of an identification code) or once.

If J=14, and the identification code is repeated in reversed form, then the identification code can comprise seven bits. The WO2021078842 publication explains that with seven dot locations, 128 possible values can be expressed (i.e., 2^7), assuming binary coding is used.

The publication teaches that the dots can either be indentations or protrusions (referenced collectively as "relief features" in this specification) formed in the surface of an object, such as a plastic bottle. Such relief features are said to produce highlights and shades when illuminated and depicted in imagery.

Reading a sparse path code involves examining a code line, whose direction and dot spacing are indicated by attributes of the start code, to discern dots (and voids) comprising the identification code, until the stop code is detected. However, the publication does not disclose how the start code is to be initially located in the input imagery.

In accordance with certain aspects of the present technology, applicant details more effective uses of the dot locations allocated to the message portion of a sparse path code than the reversed-repetition arrangement taught in the cited publication.

In accordance with other aspects of the present technology, applicant details various methods by which a start code (or other sync string) can be accurately located in input imagery.

In accordance with still other aspects of the present technology, applicant details other modifications and improvements to sparse path codes that can be employed to achieve better performance.

The foregoing and other features and advantages of the present technology will be more readily apparent from the following detailed description, which proceeds with reference to the accompanying drawings.

BRIEF DESCRIPTION OF THE DRAWINGS

FIGS. 5A-5D show different filter kernels that are useful in enhancing marks of sparse path codes to aid detection.

FIGS. 6 and 7 show other filter kernels that are useful in enhancing marks of sparse path codes to aid detection.

FIG. 23 shows that a dot, or other mark, can be virtually divided into an array of sub-cells, e.g., each 20 microns on a side.

FIGS. 24A-24C show that each of the sub-cells of the dot of FIG. 23 can be marked with marks of different sizes.

DETAILED DESCRIPTION

Figure 1:
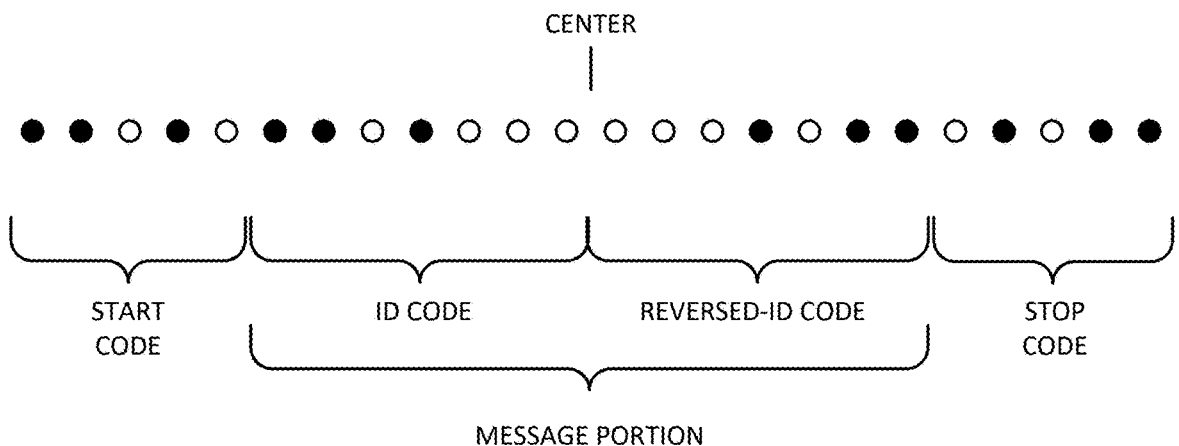
FIGS. 1, 2 and 3 illustrate aspects of a prior art sparse path code.

FIG. 1 shows a sample sparse path code, based on FIG. 1 of publication WO2021078842. On the left is the start code, which occupies five locations and has the pattern "ddndn." If a dot is taken as a binary "1," and the absence of a dot is taken as a binary "0," the start code has the binary form 11010. The following dot locations comprise the message portion, which expresses the item identification code twice—the second time in reverse order. The stop code then follows (i.e., the start code in reverse order).

Figure 2:
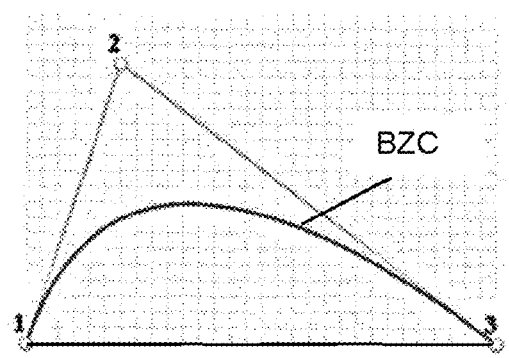
Figure 3:
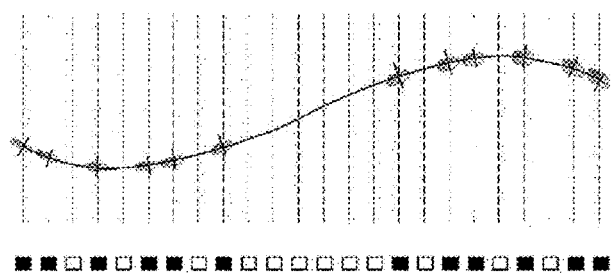

As noted, the sparse path code can follow a Bezier-curved path. A three-point curve is shown in FIG. 2 and a four-point curve, with dot markings indicted, is shown in FIG. 3. (These figures are reproduced from FIGS. 5A and 4B, respectively, of the cited publication.)

Figure 4:
FIGS. 4 and 4A illustrate a prior art sparse path code formed on a molded plastic container.
Figure 4A:
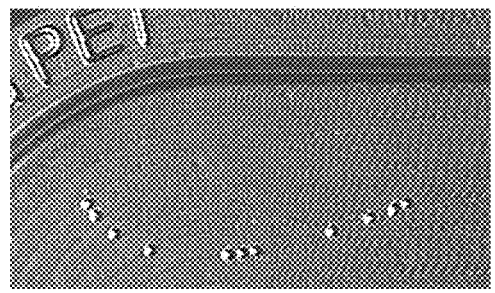

FIG. 4 is a photo showing a black plastic tray bearing multiple sparse path codes, reproduced from the web site of Filigrade BV, which is understood to be a corporate affiliate of the applicant of the cited publication. FIG. 4A is an enlargement from FIG. 4.

The cited publication does not indicate the purpose of the identification code, except that it provides identification data. The publication instructs that the code can be arranged on the outside surface of a bottle (preferably plural times) to enable separation of the bottle from other waste based on analysis of camera data depicting the code pattern on the bottle.

The present applicant particularly teaches that the message capacity can be used, in one embodiment, to represent a single attribute about the bottle, such as whether it originally contained a food product (e.g., a beverage) or a non-food product (e.g., a chemical cleanser). Such a food or non-food message permits food-containing items to be to be separated from non-food containing items, to assure that recyclate from the former is not contaminated by recyclate from the latter. Other attributes about the item, on which sorting can additionally be based, e.g., its plastic composition, can be determined otherwise, such as by near infrared response (NIR) or artificial intelligence (AI) techniques.

(Identification of materials by NIR and related methods is detailed in U.S. Pat. Nos. 5,703,229, 6,433,338, 6,497,324, 6,624,417, 20040149911, 20070296956, 20190047024 and 20190128801. Identification of items by AI and related methods is detailed in U.S. patent publications 20180016096, 20180036774, 20190130560 and 20190030571 to AMP Robotics, Inc., CleanRobotics, Inc., and ZenRobotics Oy.)

In a preferred embodiment, the two states of such a single attribute (e.g., food/non-food) are signaled using two different multi-bit sequences. In one implementation, the two sequences are random. In a preferred implementation, the two sequences are mutually-orthogonal.

The message capacity in publication WO2021078842 is 14 bits. Two random 14-bit sequences that may be used in the present applicant's implementation are:

1 1 1 0 0 0 0 1 1 0 1 1 1 0 indicates "food"
0 1 0 0 0 1 0 1 1 0 1 0 0 1 indicates "non-food"

The former can be used to mark food containers; the latter can be used to mark non-food containers.

The just-presented sequences are not mutually-orthogonal. That is, if the 0s are replaced by −1s, and corresponding elements of the two sequences are multiplied, then the sum of these 14 products is not equal to zero, i.e., their dot product is not zero. (For sequences that are an odd number of elements in length, we regard sequences having a dot product of two to be mutually-orthogonal.)

Two 14-bit sequences that are mutually-orthogonal are 1 0 1 0 0 0 1 1 1 0 1 1 0 0 indicates "food"
1 0 1 1 0 1 0 0 1 1 0 1 0 1 indicates "non-food"

Thus, in accordance with one aspect of the present technology, the J (e.g., 14) locations of the message portion of the code described in publication WO2021078842 are used to convey one of two sequences to respectively signal one of two states. Desirably the two sequences are random, and preferably they are mutually-orthogonal.

As noted, the repetition of a 7-bit identification code in WO2021078842 permits an error (e.g., mis-reading of a single bit) to be discovered. However, no recovery from such error is possible. There is no clue as to the most-likely value of the message. In the just-described arrangement, in contrast, recovery from the error is often possible; the most-likely value of the message can be readily determined.

In accordance with such aspect of the present technology, decoding is performed by computing the dot product between the recovered bit sequence (including possible errors) and each of the two known sequences. Whichever dot product is higher indicates the more probable message.

To illustrate, imagine a bottle is marked with the first of the two random code sequences above, to indicate a food container. We express the sequence using −1 and 1 notation (instead of 0 and 1 notation) to make the math more evident. Such a container is marked as 1 1 1 −1 −1 −1 −1 1 1 −1 1 1 1 −1 (sequence as originally-marked)

Due to dirt or other interference, imagine that this sequence is erroneously-read from the container in a waste flow. In particular, imagine the second bit is flipped and erroneously-read as −1, i.e.:

1 −1 1 −1 −1 −1 −1 1 1 −1 1 1 1 −1 (erroneous sequence as read)

Two dot products are computed. The first is between the sequence as read and the "food" sequence, i.e.:

1 −1 1 −1 −1 −1 −1 1 1 −1 1 1 1 −1 (erroneous sequence as read) and 1 1 1 −1 −1 −1 −1 1 1 −1 1 1 1 −1 indicates "food"

This yields a dot product of 12. (13 of the bit pairs match; one bit pair does not match.)

We likewise compute the dot product between the sequence as read and the "non-food" sequence, i.e.:

1 −1 1 −1 −1 −1 −1 1 1 −1 1 1 1 −1 (erroneous sequence as read) and

−1 1 −1 −1 −1 1 −1 1 1 −1 1 −1 −1 1 indicates "non-food"

Multiplying corresponding elements and summing yields a dot product of 0. (7 of the bit pairs match; 7 pairs don't match.)

Since the former dot product (12) is greater than the latter dot product (0), this indicates a high likelihood that the bottle is "food" instead of "non-food." (The exact likelihood can be computed from probability theory.)

Although this example considered only an error in a single bit position, recovery is likewise possible by such dot product technique from multi-bit errors.

Instead of indicating a single attribute as having one of two states (i.e., a single bit payload), the J (e.g., 14) dot locations of the message portion of the code can be used to convey a two-bit payload. In such case the J locations can be divided into plural blocks, namely K blocks of L locations each, where L=J/K. If two blocks are used (K=2), then each block is used convey one of two different 7-bit (i.e., 14/2) sequences, instead of the single pair of 7-bit sequences in reversed form, as taught in the cited publication. Again, in applicant's implementation, each of the sequences is desirably random, and preferably mutually-orthogonal.

In similar fashion, three- or four-bit messages can be conveyed by dividing the available dot locations of the message portion into three or four blocks (i.e., K=3 or 4), and using each to convey one of two different dot sequences to represent the two different bit states, i.e., employing six or eight unique dot sequences in all. (To keep the blocks the same size, the sparse path code is desirably lengthened to provide more than 14 message bit locations. For example, lengthening to provide 15 message bit locations (i.e., J=15) allows three blocks of five locations each. Lengthening so that the message portion is 16 locations in length allows four blocks of four locations each.) Again, each block is occupied by one of two different bit sequences to signal one of two states. All of the bit sequences are desirably different and random, and are preferably mutually-orthogonal.

Applicant prefers, however, when conveying information longer than a bit or two or three, to employ different encoding strategies. In particular, rather than conveying one bit per block, applicant prefers to use larger blocks, and represent plural bits by each. For example, to convey a payload of four bits, the J (14) dot locations are divided into two blocks of seven dot locations each (instead of four blocks of four dot locations each, as in the preceding paragraph). Each block is used to convey one of four different (preferably random, or orthogonal) bit sequences, representing the four possible states of two bits.

With payloads more than a few bits in length, applicant especially prefers to use an error-correcting code, e.g., a block code. Hamming or BCH codes are exemplary. For example, to represent a payload of eight bits, the J (14) dot locations are divided into two blocks of seven dots each. This time each block conveys a Hamming(7,4) code, which encodes four bits of data into a seven bit code. The extra three bits are parity bits, and their use enables correction of any single-bit error (or detection of all single- and double-bit errors). A Wikipedia article about Hamming(7,4) codes is attached to the priority provisional application 63/240,821 and forms part of this specification.

If the number of dot locations in the message portion is two times the number of information bits to be conveyed, or larger (that is, a redundancy factor M is two or more), then applicant typically does not divide the dot locations into plural blocks. Instead, the available dot locations are allocated to representation of a single convolutional code (which may be a tail-biting code). The rate of the code is set to the inverse of M. For example, if 15 dot locations are available (J=15), and the payload to be conveyed is 5 bits, then convolutional coding with rate 1/3 can be used.

In some embodiments of the technology, the payload is 10, 20 or 30 or more bits in length, which case message lengths of 20, 40, 60 or more can be used, e.g., in conjunction with convolutional coding.

In all of the foregoing examples, one or more of the available dot locations can be reserved to convey one or more checksum or CRC bits.

Code Reading

In publication WO2021078842, the process of reading a sparse path code from captured imagery begins with searching the imagery to locate a start code, and a (proximate) stop code. As indicated, the publication does not disclose how these operations are performed. Once located, an initial reading line is defined between the central dot of the start code and the central dot of the stop code. This line may be refined, e.g., taking into account the orientations of the start and stop codes, and the locations of other of these codes' component dots. The message is then read by examining locations along this line to identify dots or voids, apparently at uniformly-spaced intervals along the x-axis. The publication also comments on the problem of a "kink" in the code.

As noted, one difficulty with this procedure is finding the start and stop codes, about which the publication is silent.

Applicant has found it advantageous to apply a filtering operation to the image data first. A Laplacian filter has been found satisfactory. Such a filter can be realized by convolving input camera image data with a 3×3 or larger filter kernel in which the center value(s) is of large magnitude, and the outer values are smaller and of the opposite sign. The magnitudes of the outer values can be the magnitude of the inner value (summed if multiple inner positive values are used), divided by the number of outer values. FIGS. 5A-5D show exemplary filter kernels.

In an exemplary application of reading sparse path codes from waste items traveling on a conveyor beneath a camera, the resolution with which the codes are depicted in the camera imagery is known, within an error tolerance of 10-20%, due to the fixed sizes of the codes, and the known imaging distance. For example, dots may span an area of about 3 pixels, and the dots (and voids) may be spaced along the Bezier curve at center-to-center intervals of about 7 pixels. In such case the filter kernel can be tailored to correspond to the expected dot and spacing dimensions. For example, the filter kernel can have larger values spanning a 3×3 area in the center of the kernel, surrounded by about 3 cells in all radial directions having smaller values of opposite polarity. Usually the coefficients sum to zero. FIG. 6 illustrates.

A Laplacian filter is a form of edge detector—accentuating edges over continuously-changing pixel values. Many other edge detectors are known, and can be used in locating start and stop codes instead of a Laplacian filter.

In some embodiments, the input imagery is filtered with plural different filters, such as Laplacian filters of different scales. In one particular embodiment the input imagery is filtered using the kernel of FIG. 6, and is separately filtered using the kernel of FIG. 7. The latter kernel has positive values spanning a 2×2 area in the center, and is smaller in extent. Two filtered images are thereby produced—each of which can be separately analyzed for a sparse path code.

Filters as just-described enhance any dot that may be present in the input imagery, particularly (in the cases of FIGS. 6 and 7) dots of the expected scale.

Applicant's detection process next examines the filtered imagery for dot pairs. This process begins by searching the filtered imagery for pixel groupings characteristic of an isolated dot of the expected size range (e.g., between 2×2 and 5×5 pixels). In an exemplary embodiment, in which the diameter of an expected dot corresponds to three camera image pixels, regions of 4×4 or 5×5 pixels are examined to determine their local contrast—the difference between the lightest and darkest pixel values. If this value exceeds a threshold value (e.g., 128, if 8-bit imagery is employed), the region is regarded as having a dot. If such a dot is found, the imagery around the dot is searched, at a radial distance equal to the expected dot interval (e.g., seven pixels, plus or minus a pixel or two), for a second isolated dot of similar size (e.g., within a pixel in width) of the first dot. If such a second dot is found, this pair serves as the basis for further analysis.

Such a dot pair gives various information: the characteristic pixel values (and pixel value distributions) by which dots are represented in this filtered imagery (e.g., light, or dark, and in which pixel value range), the observed (as opposed to simply expected) spacing of dot locations (in pixels), and the angular direction of a line connecting the two dots. This line is projected in both directions in the image space. Imagery along this projected line is then examined on each side of the dot pair, looking for the third dot in the "ddndn" start code pattern (and the third dot in the "ndndd" stop code pattern), at twice the observed dot location spacing (to account for the void in the center of the start and stop codes), with an error factor of a pixel or two in all directions. If such a dot is found on one side of the dot pair (and not the other), the filtered imagery is checked a further dot spacing interval beyond the third dot to confirm that an expected void is located there. If so, the image region encompassing the dot pair, and extending to the just-detected void region, is identified as a candidate start (or stop) code.

The procedure of the two prior paragraphs is repeated across the image—trying to identify a candidate start or stop code from each isolated dot in the expected size range. If two candidate codes spatially overlap (e.g., share a dot), both are disqualified.

Each candidate code may be a start code or a stop code, depending on the direction in which it is read. In both instances, the associated message data and the associated companion start/stop code should both be found in the half-plane of imagery that is (1) bounded by a line perpendicular to the axis of the candidate code, and (2) remote from the dot pair.

Figure 8:
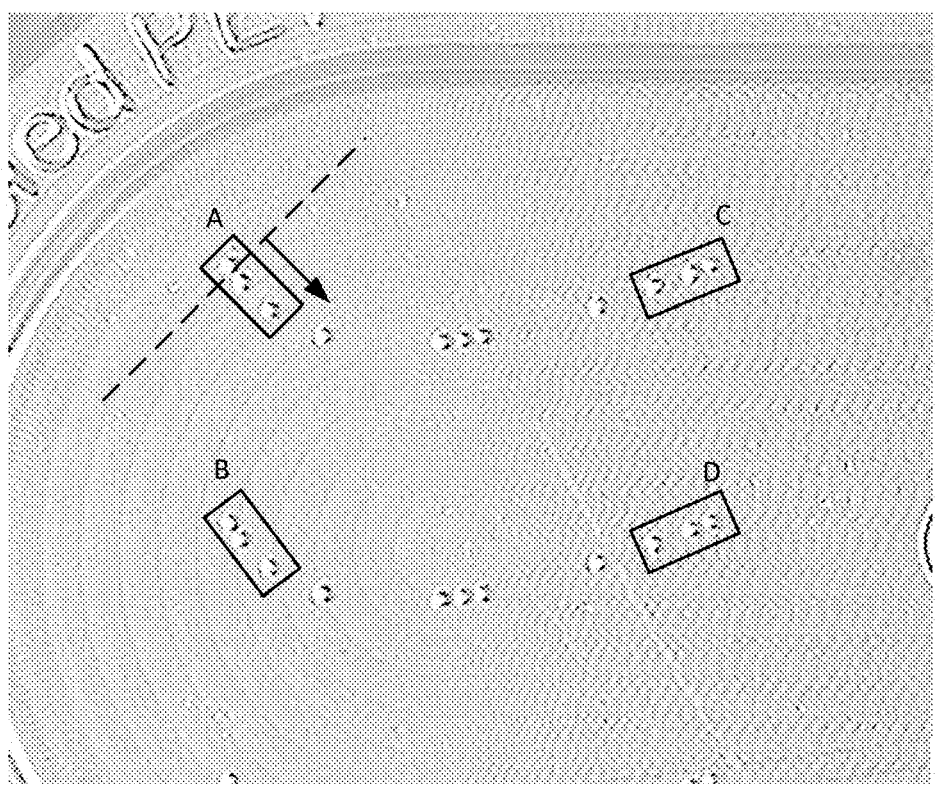
FIGS. 8 and 9A-9D illustrate aspects of a method for detecting a sparse path code.
Figure 9A:
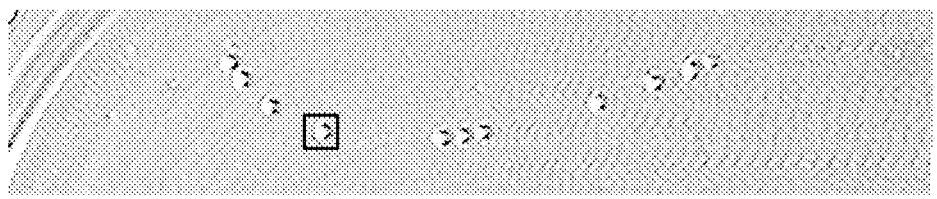
Figure 9B:
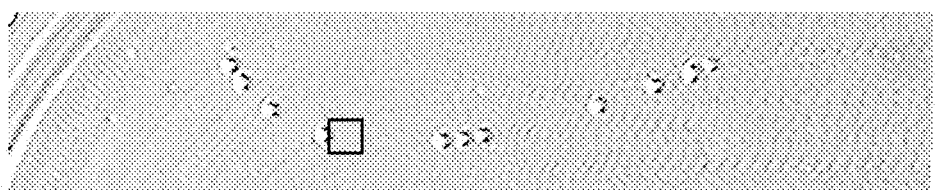
Figure 9C:
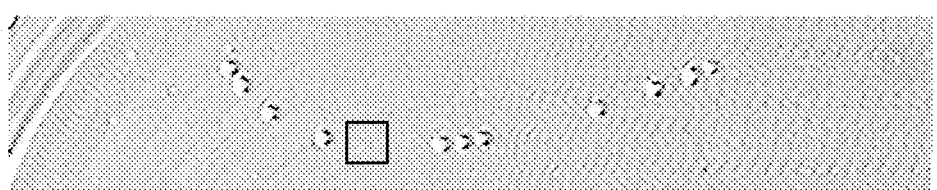
Figure 9D:
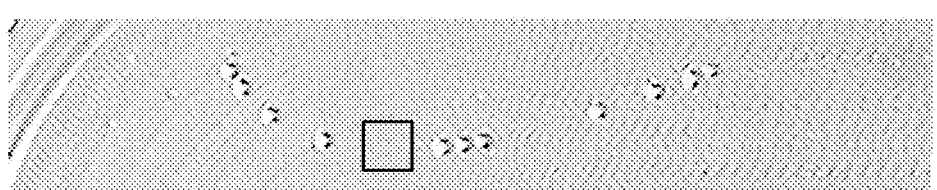

FIG. 8, which is a lightened excerpt from (unfiltered) FIG. 4, helps illustrate. Four candidate codes A-D, located by the above-described procedure, are shown. The dashed line and arrow show a half-plane for candidate code A. In that half-plane (i.e., to the right and down from the dashed line) both the message data, and the companion start/stop code to code A, should be found. The procedure continues by examining other candidate codes to determine which, if any, is the companion code to code A (i.e., the stop code, if code A is the start code, or vice versa).

This evaluation proceeds in order of the other codes' proximity (pixel distance) to code A (e.g., based on center dot-to-center dot distance). The process looks for the nearest other candidate code whose isolated dot is nearer than its paired dots. For code A, code B is closest. However, the isolated dot of code B is further from code A than the paired dots. This disqualifies code B. We then examine the next-closest, which is code C. Here the isolated dot is nearer to code A than its paired dots, so it is a suitable companion to code A.

If code C was wrongly-oriented (like code B), the process would have continued to consider code D, and so on. But at some point the possible companion codes are too far apart in the imagery to be physically part of the same sparse path code. In a particular embodiment, if the paired-dots of one code are more than 180 pixels distant from the paired-dots of another code, they are disqualified as potential companions. (In some embodiments, possible companion codes are also disqualified if they are too close. For example, if the paired-dots of one code are closer than 140 pixels distant from the paired-dots of another code, they are too close, given the expected 7 pixels between dot locations and the number of dot locations in the code—even accounting for foreshortening of the distance between the start/stop codes of a sparse dot code due to curvature.)

Each candidate code is processed in this fashion—examining a half-plane of imagery for a nearby companion code oriented with its isolated dot nearer than its paired-dots. A companion code is thereby found for code A (i.e., code C), and a companion code is thereby found for code B (i.e., code D). The analysis similarly finds companion codes for codes C and D, although they've already been (tentatively) paired with codes A and B, respectively. The pairings should be replicated—discovered once for one of the companion codes, and re-discovered for the second of the companion codes. If such pairing is not replicated, e.g., if search for a companion code to code C discovers a code Y instead of re-discovering code A, then further processing (detailed below) can be employed.

Once pairings of companion codes are established, the dots comprising the intervening message data are successively discerned. For example, from the start code, the filtered imagery is examined in a region centered along a line defined by the axis of the start code, and a distance away equal to the observed dot spacing. The local contrast of the region is computed and compared against a threshold to determine whether dot is present. The region is sized between minimum and maximum sizes (e.g., 3×3 and 7×7 pixels) to reflect uncertainty about where, exactly, the dot will be found (e.g., to allow for curvature of the path). The size of the region varies depending on recent history. If the previous dot location was empty (void) then the region is incrementally enlarged (but not beyond a preset maximum) since the void provides no information about position of the reading line. If a dot was found near the previous dot location, the exact location of this dot is discerned and is used to adjust the forecast reading line, and the region is reduced in size to reflect improved confidence about the position of the reading line (but not below a preset minimum). Discernment of dot values continues in this fashion, assigning a "1" to dot locations where a dot is found, and a "0" to dot locations where a void is found.

FIGS. 9A-D illustrate the resizing of the region based on recent history. At FIG. 9A a smallest region was defined (since this dot location immediately follows the start location), and a dot was found, so the first bit of the message data is "1." At FIG. 9B, the same size region is used, since a dot was just-found. A void is found here, so the second bit of the message data is "0." At FIG. 9C a larger region is used, since a void was just-found. A void is found here too, so the third bit of the message data is "0." At FIG. 9D a still-larger region is used (the maximum size) since a void was just-found. A void is found here too, so the third bit of the message data is "0." The process continues in this manner— using the region size shown in FIG. 9D until a dot is found, which then triggers use of an incrementally smaller region for the following dot location.

In one arrangement, this process continues until the companion (stop) code is encountered. In another arrangement the process is started from each end and works towards the middle until a common dot is reached. In either case, if the process goes off-track, e.g., not reaching the companion code, or not reaching a common dot, within an expected number of dot intervals, then that attempt to discern message data from that pair of companion start/stop codes is abandoned.

Once the dot values are discerned from the message portion of the code, the payload is extracted. This operation is performed by a process that corresponds to the earlier process establishing the code. As noted, an encoding process that enables correction of errors during decoding is desirably employed, and one or more checksum or CRC bits can also be included in the code. Such information is checked to assure that the payload has been correctly decoded.

In instances in which a start/stop code is found to be a companion with two other such codes, as in the foregoing hypothetical in which code C is found to be a companion to both code A, and code Y, then message extraction can be attempted based on both pairings. Pursuing extraction from code C will lead, along a Bezier curve, to at most one or the other of codes A and Y. The other code will thereby be found to be an errant companion.

In some embodiments, "soft-decision" decoding is performed. In soft-decision decoding, each dot is not discerned as simply present (i.e., "1") or absent (i.e., "0"). That form of decoding is termed "hard-decision" decoding. Instead, a probability is associated with each discerned bit. In one particular embodiment the probability is indicated by the local contrast in a 3×3 pixel region centered at each dot location on the reading line. (After all the marked dots have been successively found, a Bezier curve of the expected shape is scaled and oriented in the imagery to yield a best-fit to the discerned dot locations.) The 3×3 locations can then be centered on the expected dot locations along this curve, and their contrasts can be determined. The higher the contrast at each such dot location, the more probable a "1" is signified; the lower the contrast, the more probable a "0" is signified. These contrast values can be mapped, by a table, to floating point probability values p between 0 and 1, reflecting confidence in the assessment that a dot location has a dot or a void. Alternatively, a probability metric p can be computed simply from the maximum and minimum pixel values in the region, using the formula:

$$p = \frac{|\max - \min - 128|}{128}$$

This function yields a probability of 1 if the pixel difference is zero, and likewise if the pixel difference is 256 (assuming 8-bit pixel values), but yields a probability of 0 if the pixel difference is 128. A soft-decision error correcting decoder (e.g., a soft-decision Viterbi decoder) can then take into account the differing bit-probabilities in determining the most-likely payload represented by the code. (A Wikipedia article for Soft-decision decoder is attached to provisional priority application 63/240,821 and forms part of this specification.)

Reference was made, above, to filtering the camera data with a Laplacian filter kernel. The scale of the kernel, and its component coefficients, can be designed based on an understanding of theoretical considerations. But as is familiar, theory and practice sometimes don't align.

Accordingly, instead of designing a filter kernel based on theoretical considerations, applicant prefers to process the camera imagery using one or more convolution kernels learned through a machine learning process. One such approach employs a convolutional neural network configured for region labeling. That is, the network takes image data and identifies a bounding box around a set of pixels depicting a recognized item class. In the present application, the network can be trained to recognize patterns having the appearance of sparse path codes, and to return pixel coordinates of bounding boxes around such possible codes. This serves as a localization operation—identifying regions depicting potential codes from within larger image sets. Such regions can later be analyzed to perform a more precise synchronization process, prior to decoding. Some neural networks can even be trained to localize candidate start and stop codes within the identified regions.

Many networks are suitable for such application. Some employ so-called "R-CNN" techniques (region-based convolutional neural networks), such as that detailed by Girshick in "Fast R-CNN," 2015 IEEE Conference on Computer Vision and Pattern Recognition, pages 1440-1448, and elaborated in Girshick's paper with Ren, et al, "Faster R-CNN: Towards Real-Time Object Detection with Region Proposal Networks," arXiv preprint arXiv:1506.01497, Jun. 4, 2015. See, also, patent document US20170206431.

Another technology for such spatial labeling of items within an image frame employs so-called "YOLO" ("You Only Look Once") techniques, e.g., as detailed by Redmon et al in their papers "You only look once: Unified, real-time object detection," Proc. of the IEEE Conference on Computer Vision and Pattern Recognition 2016, pp. 779-788, and "YOLO9000: Better, Faster, Stronger," Proc. of the IEEE Conference on Computer Vision and Pattern Recognition 2017, pp. 7263-7271.

Other approaches include SSD (Single Shot Multibox Detector by Liu et al) and R-FCN (Region-based Fully Convolutional Networks by Dai et al), etc.

Such networks are typically trained by presentation of in-class, and out-of-class samples of image data, in which the in-class data is labeled with bounding box coordinates for the item being recognized. Coefficients of the convolutional layer(s), and weights of the classification layer(s), are typically adjusted by a gradient descent process (e.g., reverse gradient descent) to minimize an error function discerned by knowledge of which images are in-class and which are out-of-class, and where the item of interest is in the former.

To generate in-class training data, applicant starts with hundreds of images of actual start (stop) codes, molded (or laser-marked) in different plastics (clear, black, opaque, etc.), and imaged under different lighting colors, intensities and illumination angles. For each image, coordinate locations for a bounding box surrounding the code are manually determined and stored in association with the image.

From this set of actual code images applicant derives a much larger set of synthesized code images, by varying parameters such as rotation, scale, translation, Gaussian blur, motion blur, contrast, color channel magnitudes and ratios (if color imagery is used) and/or brightness, etc. In some instances, the codes are excerpted and composited with actual images of conveyor belt, which appear around the start/stop code depictions (and in the case of transparent plastic items, are made visible through the start/stop code depictions by alpha-blending). The coordinate location data for the code within each such synthesized image is derived from the earlier-determined coordinate data, based on the geometrical transform operation (if any) to which the code depiction has been subjected.

Out-of-class training data is generated similarly. In this case, however, the starting imagery comprises images depicting different plastics and conveyor belts without start or stop codes, again illuminated under different conditions. Again, a much larger set of synthesized out-of-class training data is generated by modifying these images in scale, rotation, translation, Gaussian blur, motion blur, contrast, color, and/or brightness.

By such techniques, tens- or hundreds-of-thousands of training images (or more) are developed to train a neural network.

Figure 10:
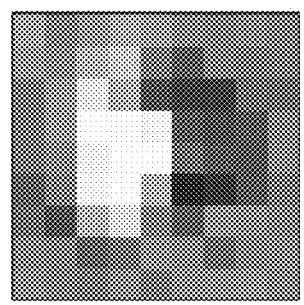
FIG. 10 shows pixel values for a small neighborhood of imagery centered on a single dot of a sparse path code.

During such training, the coefficients of the convolutional layers adapt themselves to respond to particular characteristics found in the training images, enabling the network to discriminate between in-class and out-of-class images. In discerning characteristics to recognize start/stop codes presented as light dots on a dark background, the network may learn, e.g., that the dots rarely present themselves as symmetric white features in a surrounding field of constant dark tone. More usually the dots will present themselves in variant fashion, such as the dot shown (in greatly enlarged form) in FIG. 10. Thus, one or more of the convolutional layers of the network may include a kernel iteratively-tuned (by gradient descent training) to respond to patterns having configurations like that shown in FIG. 10.

Such networks do not simply learn which convolution kernels best serve the task of recognizing dots in imagery. Training can further configure such networks to recognize the pattern of dots and voids that are characteristic of the start (stop) pattern. Accordingly, such networks obviate the need to recognize a second dot adjacent a first dot, followed by a void, followed by a third dot, followed by another void, as detailed above. Instead, the network shortcuts this process and produces output data indicating the location of the start (stop) code(s) in input imagery. With such locations known (e.g., as indicated by the bounding box rectangles around the start and stop codes in FIG. 8), processing can immediately proceed to the task of pairing companion start/stop codes, and discerning the dots comprising the intervening message data, from which the payload data can then be extracted.

In still other arrangements, a convolutional neural network is trained not simply to locate a sync code within image data, but rather is trained to recognize a full sparse path code, and produce output data indicating its message data. Such network is typically trained with image samples depicting each different message state of the code, so that the classification operation identifies which message is represented by the code.

To reduce the computational burden, the neural network may not be sized to operate on a large image frame (e.g., a million pixels) at once. Rather, such a frame is segmented into overlapping blocks, e.g., of 512×512 pixels, and each of these blocks is separately presented to the network for classification. Alternatively, multiple such networks can be used, e.g., one dedicated to each of plural overlapping block regions of a captured image frame.

An algorithmic localizer can alternatively be used, which performs the following operations. First, the captured image is converted to greyscale (if not already) and edge detection is employed. Second, a normalized cross-correlation operation is then performed with an idealized pattern having all dot locations marked. This, peaks are found in the cross correlation domain, and any peaks that are within a small distance of each other are combined. Finally, the set of consolidated peaks are returned as localized blocks for further synchronization processing.

Edge detection can be as described above. Preferable, however, is to use a neural network to train the values in the edge detection kernel(s) so as to yield best results when the further operations leading to payload recovery are performed (e.g., normalized cross-correlation, synchronization and decoding).

Other Code Shapes

Applicant's arrangements detailed above provide various improvements to sparse path codes and their reading. A further improvement is to change the configuration of the code so that spaced-apart start and stop codes are no longer required.

One such code may be termed a closed-path code. In such a code, a distinctive sync string pattern of dots serves both as the beginning of the code and the end. The closed-path code of FIG. 11 is exemplary.

Figure 11:
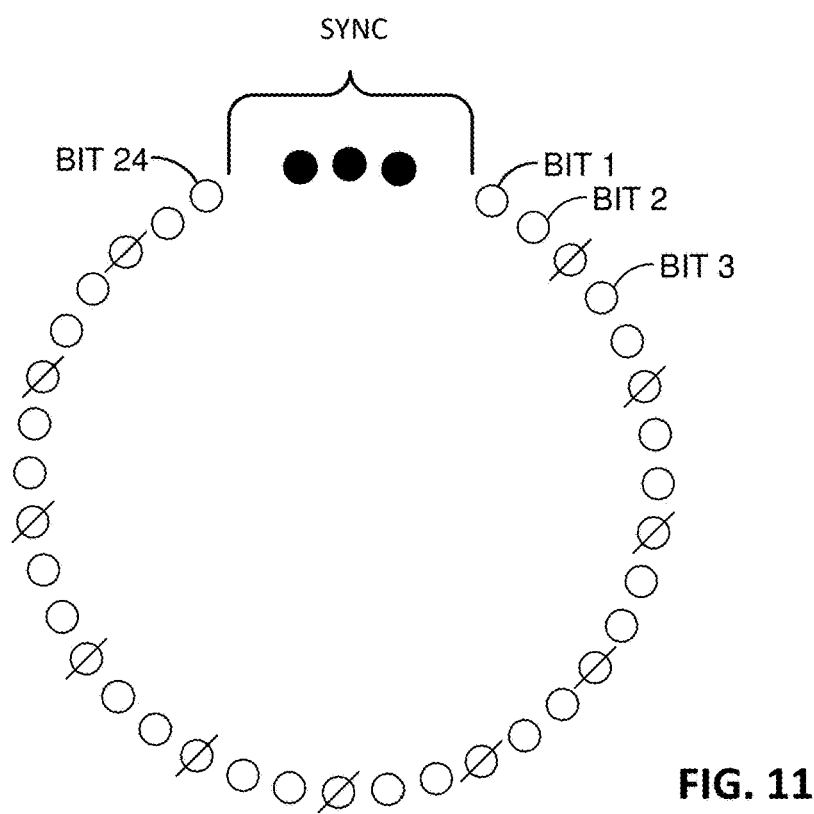
FIG. 11 shows a sparse path code incorporating certain aspects of the present technology.

The FIG. 11 code has the form of a circle. Each of the dot locations lies on the circle, at regularly-spaced angular intervals. The sync code is a sequence of five dot locations, the outer two of which are void and the inner three of which are dots. The other dot locations around the circle are available for the message. To make the FIG. 11 sync string distinctive, these other dot locations are subject to a constraint: every third location is left void. These empty locations are indicated by the diagonal lines. This assures there can be no sequence of three dark locations, thereby making the sync string unique.

The sync code in FIG. 11 is symmetrical. If such a closed-path code is marked on one surface of a transparent plastic tray, and is viewed through the opposite surface (so that the code appears in mirror-imaged form), there is no indication from the sync code which neighboring bit of the message is bit 1, and which is bit 24. However, if an error-correcting code is used, the 24-bit sequence can be applied to the decoder in both orders, forward and reverse, and the decoder can indicate that the sequence expressed one way is correct and the sequence expressed the other way cannot be decoded.

Figure 11A:
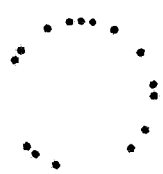
FIG. 11A shows the code of FIG. 11 as it may appear on a marked item.

FIG. 11A shows the closed-path code of FIG. 11 with sample message data.

In other embodiments the sync string may be asymmetrical, thereby enabling unambiguous determination of which bit of the message data is first and which is last.

Figure 12:
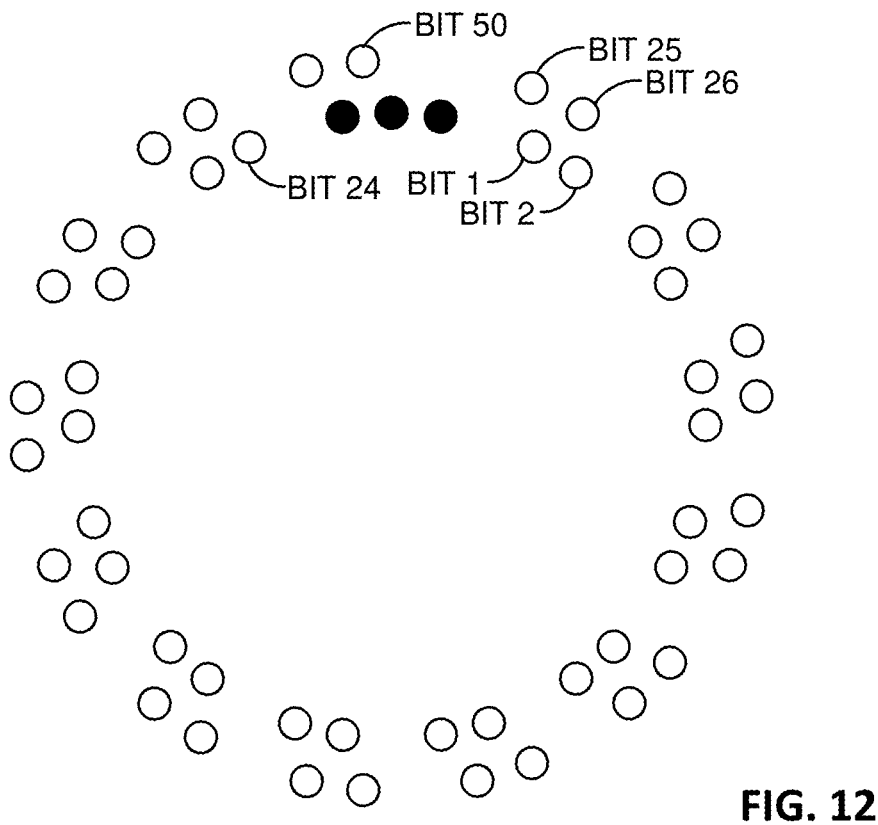
FIG. 12 shows a sparse path code incorporating other aspects of the present technology.

Although a single circular path of sparse dots is illustrated in FIG. 11, plural concentric paths can be used. FIG. 12 gives an example. Again, the constraint that every third dot location be left unmarked through the message dot locations (to avoid confusion with the sync string) can be maintained. The dot locations in each of the paths can fall on the same radial lines from the center of the code, or they may be offset (as in the case in FIG. 12). In this particular example, the second ring of dot locations spans the full circle, as it is not interrupted by the sync string. 50 bit locations are thus available for the message data. (Only the available bit locations are shown.)

Figure 12A:
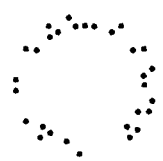
FIG. 12A shows the code of FIG. 12 as it may appear on a marked item.

FIG. 12A shows the closed-path code of FIG. 12 with sample message data.

Figure 13:
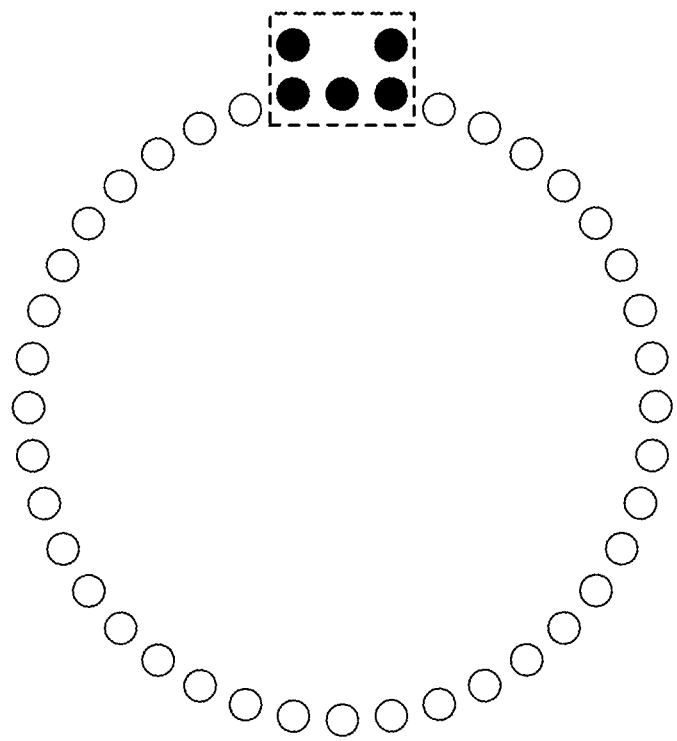
FIG. 13 shows a sparse path code incorporating still other aspects of the present technology.

The sync code need not follow the same path as the other dot locations. FIG. 13 shows a closed-path code in which the sync code (shown in the dashed rectangle) comprises three dots in a straight line. Such a sync code may further include additional dots, such as the two dots spaced vertically from the outer dots by the same distance as separates the three lower dots. In such embodiment it is not necessary for the message data to skip every third dot location, as in FIG. 11, since the sync code (now comprising five dots) can be distinguished from excerpts of the message data. (If, on occasion, the reading process mistakes another group of dots in the message data, plus two adjoining dark areas, as the sync code, then the mis-synchronization will likely cause the decoding to fail, avoiding recovery of incorrect payload data.) Thus, each successive dot location in the FIG. 13 code can represent a successive bit of the message (e.g., "1" by a dot and "0" by a void).

Figure 13A:
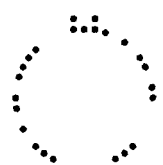
FIG. 13A shows the code of FIG. 13 as it may appear on a marked item.

FIG. 13A shows the closed-path code of FIG. 13 with sample message data.

Figure 14:
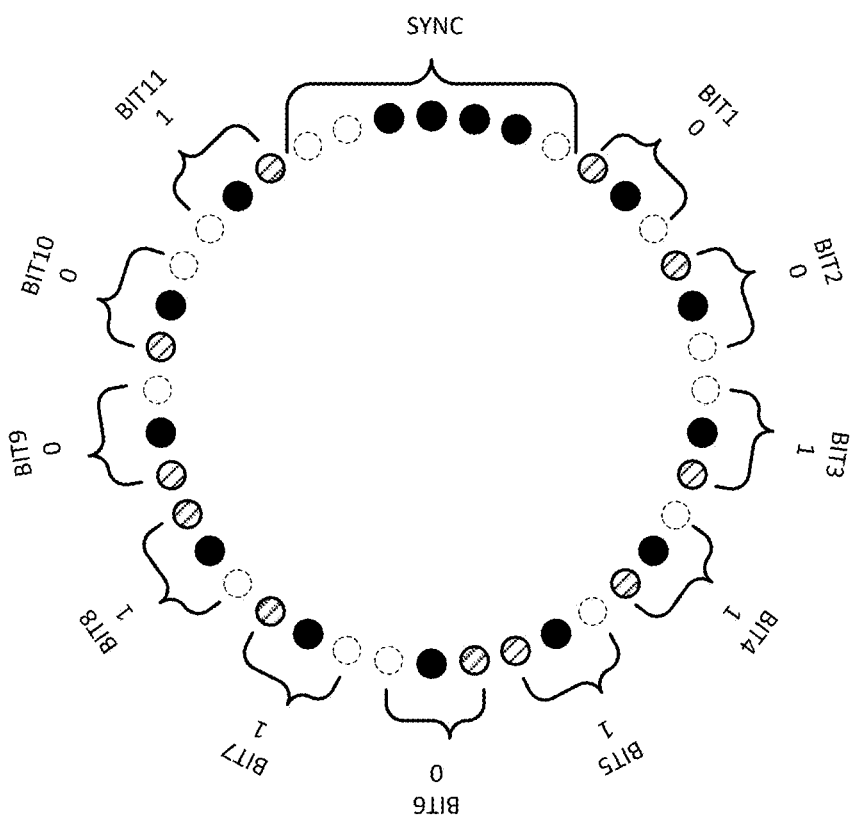
FIG. 14 shows a sparse path code incorporating still other aspects of the present technology.

The chance of mis-synchronization can be reduced to an arbitrarily low probability by further distinguishing the synchronization information from the message data (and from random patterns that may appear in the imagery). FIG. 14 helps illustrate.

In this code the sync string occupies seven dot locations: two voids on the left, followed by four dots, followed by a final void.

Each bit of the payload spans a triplet of three locations. The middle location of each triplet is always marked. A single location adjacent the middle location is marked with a dot to signal the encoded payload bit. In particular, a mark clockwise of the middle location indicates a "1" bit, while a mark counter-clockwise of the middle location indicates a "0" bit. Each bit of the encoded payload is thus signaled twice: once by a mark on one side of the middle location, and once by a void on the opposite site. (For explanatory purposes, the payload-indicating dots are shown in cross-hatch, as opposed to the solid-black of the middle dots; the void dot locations are shown by dashed circles.)

In such arrangement, dots always appear in pairs, or quads, except the triplet in the sync string.

The marking of every third dot can be regarded as an extension of the sync code, e.g., a fixed pattern whose detection can be used to establish the reading line and dot location interval. In fact, a known pattern of always-marked dots that is interspersed throughout the message dot locations (rather than segregated) can serve as a sync code by itself, provided it can be used to discern where the message data starts. A segregated sync code, of the sorts described previously, is not required.

A probability estimate for each bit of the encoded payload data can be based on (a) pixel differences between the average pixel values of small regions (e.g., 3×3) centered on (i) the middle dot and (ii) the adjacent payload dot (which should be a small difference), and (b) pixel differences between the average pixel values of small regions centered on (i) the middle dot and (iii) the adjacent void (which should be a large difference). An exemplary probability value is simply p=(b−a). Again, such a probability value can be submitted to a soft-decision decoder, in association with each discerned encoded payload bit, to obtain a decoded payload that reflects different uncertainties in different encoded bits.

Figure 14A:
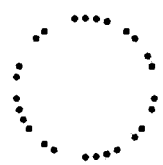
FIG. 14A shows the code of FIG. 14 as it may appear on a marked item.

FIG. 14A shows the closed-path code of FIG. 14 with sample data.

Figure 15:
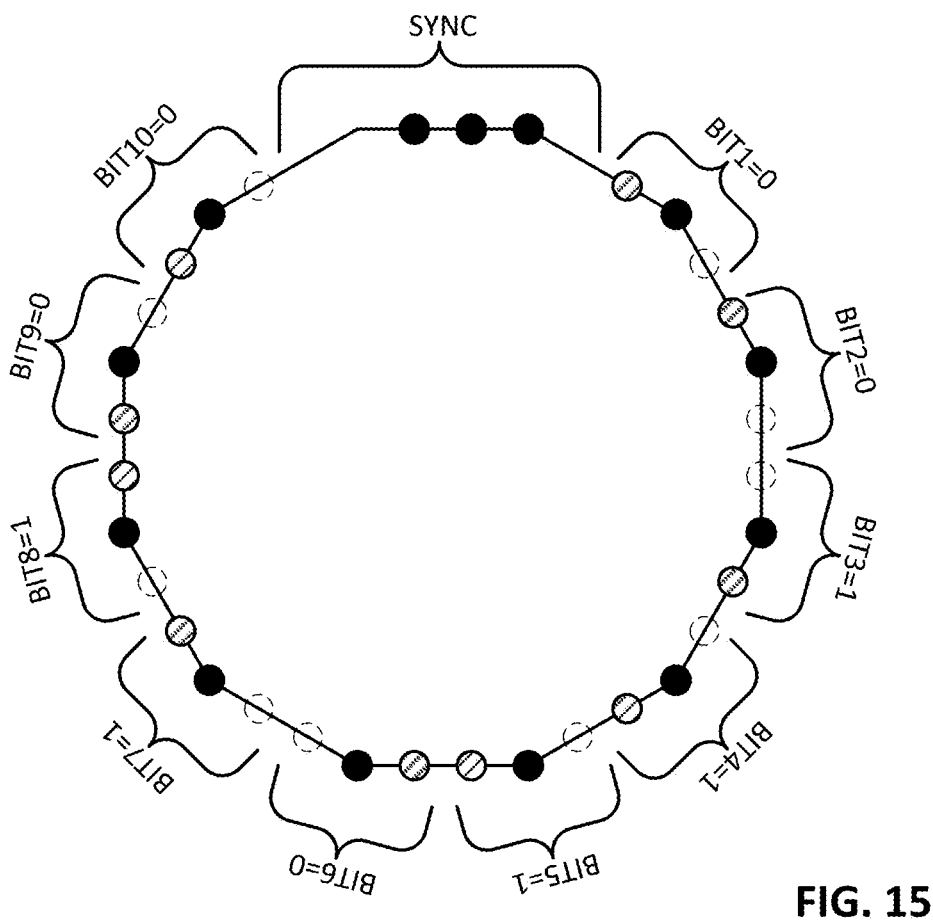
FIG. 15 shows a sparse path code incorporating still other aspects of the present technology.

Closed-path dot codes do not need to be circular; they can be any shape. FIG. 15 shows a code in the shape of a polygon. Dots are placed at vertices and along the polygon's straight edges, using the coding strategy described in connection with FIG. 14 (including two locations signaling each encoded bit—one with a void and one with a mark, on either side of an always-marked location). The fixed dots that are distributed through the message data are always found at the vertices. Again, the dots appear in pairs or quartets throughout the message portion of the code (the sync code here includes a sequence of three dots). These pairs or quartets of dots define lines that are angled at 30 degree increments from each other—a geometrical constraint that aids in finding the reading line.

Figure 15A:
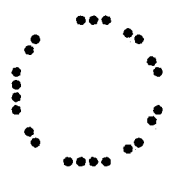
FIG. 15A shows the code of FIG. 15 as it may appear on a marked item.

FIG. 15A shows the closed-path code of FIG. 15 with sample data.

Naturally, the foregoing closed-path shapes are only exemplary. Any closed-path can be used, including triangles, squares, ellipses, irregular shapes, etc.

Detection can proceed using the methods detailed earlier. The sync code is located, and successive dot locations are examined from there to determine their dot/void status. These dot locations typically represent encoded payload data, which is then processed to extract the output payload data.

Figure 16:
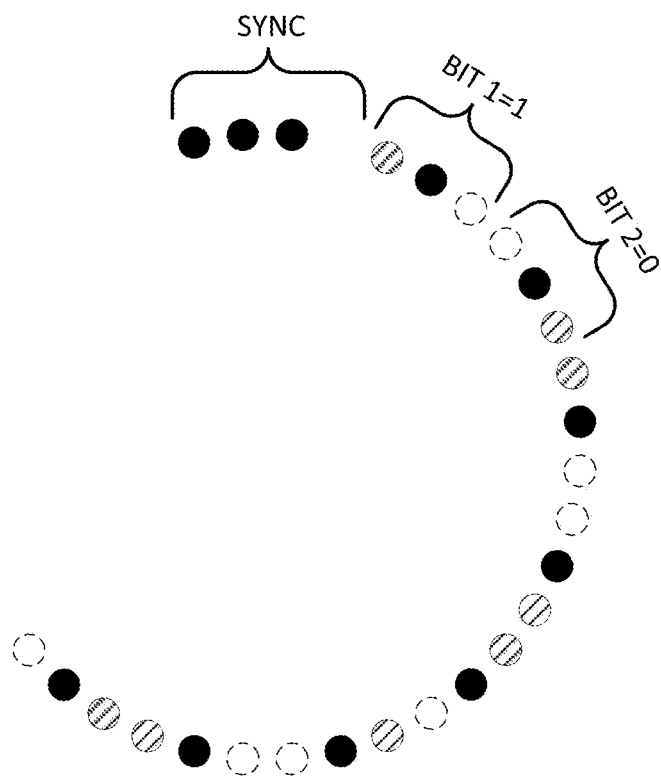
FIG. 16 shows a sparse path code incorporating still other aspects of the present technology.

The techniques described above are likewise applicable to sparse path codes that don't follow a closed path (i.e., they may be said to follow an open path). FIG. 16 illustrates. This is a sparse path code with just a single sync code (three dots followed by a void). The information conveyed by the code is again represented in triplets, comprising a middle dot that is always present, with two adjoining dot locations. A dot on one side of the middle dot indicates a "1"; a dot on the other indicates a "0." (Again, for explanatory purposes the payload-indicating dots are shown in cross-hatch, as opposed to the solid-black of the middle dots.) Again, each payload bit is essentially indicated twice—once by a dot, and once by a void on the other side of the middle dot. Again, a confidence metric for each payload bit can be determined, and submitted to a soft-decision error-correcting decoder. Again, the code comprises pairs and quartets of dots, except the sync code triplet. The path of the FIG. 16 code is an arc of a circle, rather than a Bezier curve. Despite following an open path, the FIG. 16 code includes a sync string only at one end. The detector typically knows, in advance, the expected length of the code, and so it stops determining bit values when the expected end location of the code is reached.

Figure 16A:
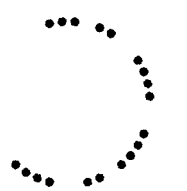
FIG. 16A shows the code of FIG. 16 as it may appear on a marked item.

FIG. 16A shows the code of FIG. 16 with sample data.

Figure 17:
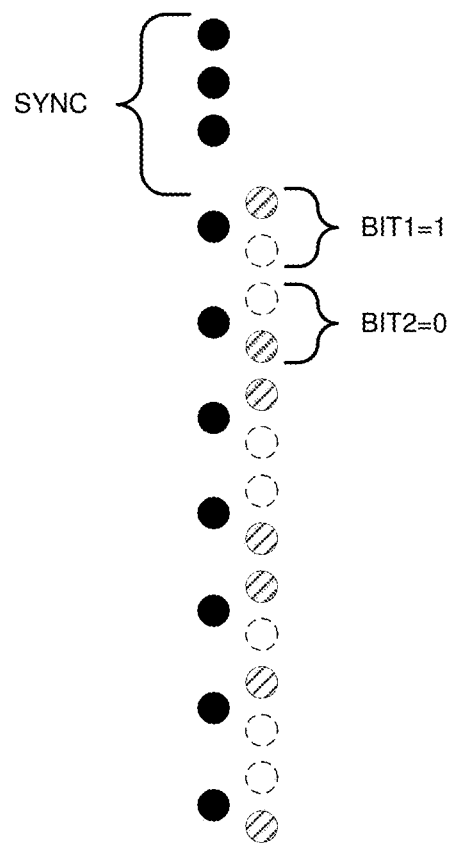
FIG. 17 shows a sparse path code incorporating still other aspects of the present technology.

FIG. 17 shows a further such variant. Here again the sync code is three dots followed by a void. In-line with the sync code is a regular pattern of fixed dots, one for each bit of the message. Each fixed dot is associated with two other dot locations—in this case to the right, and angled-up or angled-down from the fixed dot. As before, a mark in a first of these dot locations (and a void in the second) signals a "1;" a mark in the second dot location (and a void in the first) signals a "0." Again, a confidence metric for each bit can be derived from image data sampled at the three locations associated with each bit.

Figure 17A:
FIG. 17A shows the code of FIG. 17 as it may appear on a marked item.

FIG. 17A shows the code of FIG. 17 with sample data.

The use of fixed dots, interspersed in the message field, with one for each message bit, is a robustness measure that is overkill for many applications. Instead, fixed dots (or a pattern of fixed dots) can be included at longer intervals.

Figures 18, 18A:
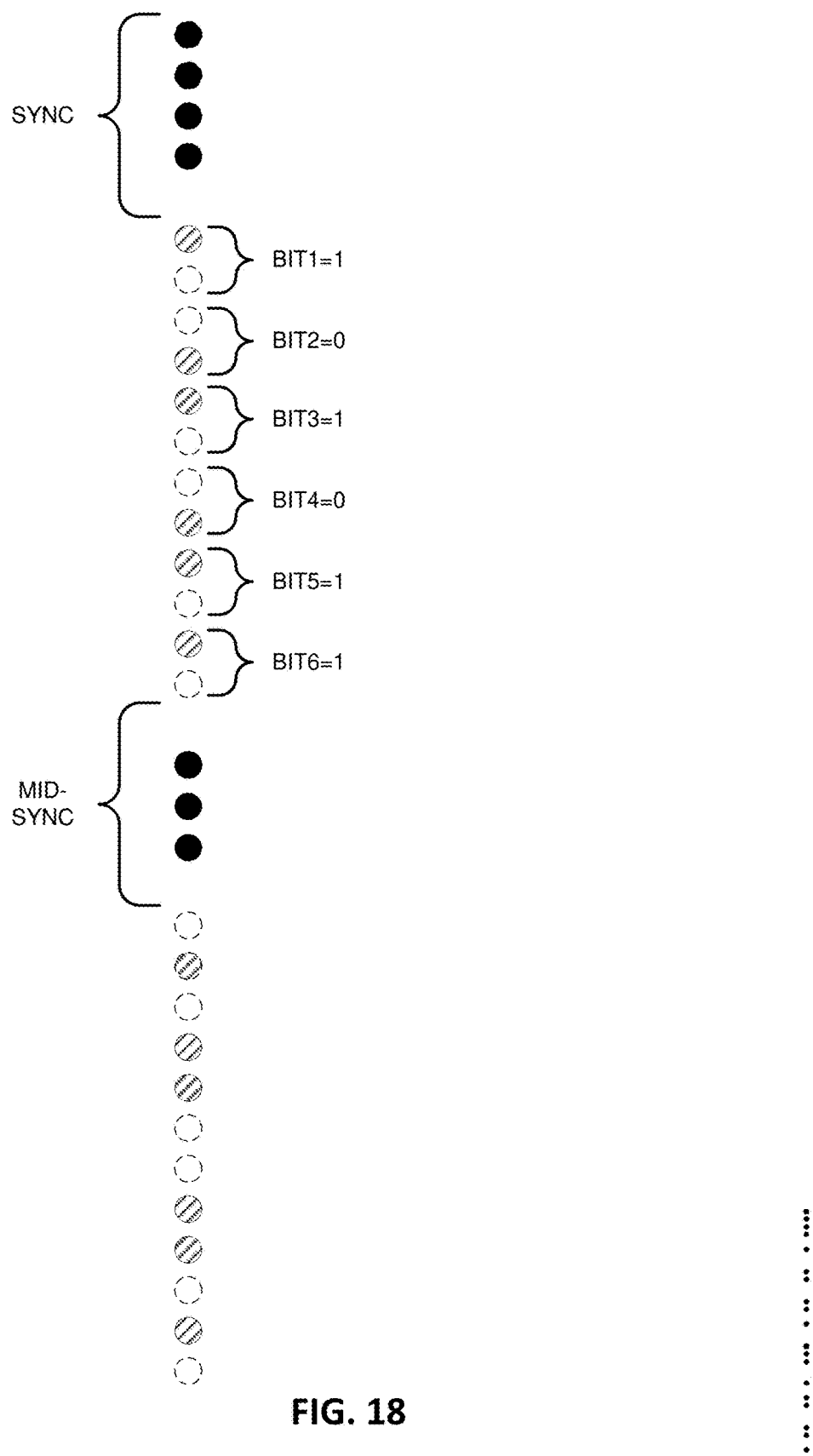
FIG. 18 shows a sparse path code incorporating still other aspects of the present technology.
FIG. 18A shows the code of FIG. 18 as it may appear on a marked item.

FIG. 18 illustrates. This is another linear code, with a sync code at one end. The sync code is four dots followed by a void. Then-follow two dot locations for each bit of the message. If the first location is marked and the second is not, a "1" is indicated; if the second location is marked and the first is not, a "0" is indicated. After many such encoded payload bits have been represented (six in this example, but longer in other embodiments), a mid-sync code is inserted. Here the mid-sync code comprises a sequence of three dots with a void on either side. Then-follows more paired dot locations, each serving to represent a single bit of the message. Such form of representation can continue, with the code including multiple mid-sync sequences at periodic (or aperiodic) intervals. During code reading, sensing of the mid-sync sequences at the expected interval increases confidence in recovered bits, and helps in adjusting the reading path.

The dots representing the message in FIG. 18 appear only in singletons or pairs. The only triplets of dots are in the mid-sync sequences. The only quartet of dots is in the initial sync code.

FIG. 18A shows the code of FIG. 18 with sample data.

In still other arrangements, the dots comprising codes can be arranged along different paths described by mathematical equations. (The description of the paths of sparse path codes by mathematical equations aids extraction of the dot sequence, since it helps predict where dots will be found.) Any of the dot arrangements described herein can be array along such paths.

One such example is a spiral path. One particular spiral path code comprises 65 dot locations. The code dot sequence begins with an always-present dot and spirals out from there. Every fourth dots is always-present and serves to aid registration refinement. 40 of the dots are dedicated to representing a 20 bit payload by a convolutional code with a 1/2 rate. The remaining dot locations serve to represent CRC check bits.

It will be recognized that codes as described herein simplify the task of detection. No longer must both a start code and a stop code be separately located. Nor must start and stop codes be correctly-paired. The use of circles and straight lines aids in locating such codes, since simple image processing techniques can quickly locate circles (and circular arcs) and lines (e.g., the Hough transform).

Particular Arrangements: Smaller Features

Publication WO2021078842 describes the dots as protrusions extending from, or recesses extending into, the surface of the item. It is understood that each such dot starts from the nominal item surface, and rises (or descends) to a vertical maximum (minimum), and then returns to the item surface, in a smooth curved surface spanning some unspecified horizontal and vertical distances. From depictions of a sample plastic tray marked with such a code, such as is shown in FIGS. 4 and 4A (reproduced from a document published by Filigrade B.V., which is a corporate affiliate of the owner of the cited publication), it appears that each dot has a horizontal extent of about 500-600 microns. The full Bezier code path, including the start and stop and identification codes, spans an area about 20 mm in length by 4 mm in width.

The publication does not provide information about the camera system used to image the code. The present applicant believes that the camera system is configured so that its focal plane is coincident with the marked surface, and a single dot in the mark spans an area of about 3×3 pixels in the camera image sensor. That is, the camera samples the marked surface at a resolution of about 150 pixels per inch. This is consistent with a promotional video (www<dot>youtube<dot>com/watch?v=8vm8dIoZodk, "FiliGrade CurvCode Sorting" uploaded Apr. 22, 2021) that shows a conveyor belt about 40 cm in width being imaged by a two-camera system. (Popular image sensors capture a field of view of about 1280 pixels, and the two cameras' fields of views are expected to overlap somewhat.)

The present applicant has surprisingly found that code marks do not require camera resolution of several pixels per dot. If error-correcting encoding of the payload is employed, e.g., as described above, and/or if soft decision decoding is employed, then instead of imaging each dot with a 3×3 (or even 2×2) array of pixels, decoding can be accomplished from imagery in which even a single pixel (sometimes less) spans a single dot. Thus, more conveyor belt can be visually monitored using fewer cameras.

Alternatively, and perhaps more importantly, it means the dots can be smaller than described above. That is, with a camera system that samples the focal plane at 150 pixels per inch, the dots can be of a 150-per-inch scale. So instead of being about 500 microns in width, each dot can be less than 200 microns in width (e.g., 170 microns). The sparse path code can then be reduced in size, e.g., from 20 mm×4 mm, to 8 mm×1.6 mm, or smaller.

In fact, using the above-referenced techniques, it is possible to reliably decode a sparse path code when the dots are much smaller than the single pixel camera resolution (provided the minimum distance between possible dot positions is on the order of a single pixel dimension). If a pixel spans a focal plane region of 170 microns on a side (i.e., 150 pixels per inch), then the dots can be 150 microns, 120 microns, 100 microns, 75 microns, 66 microns, 50 microns, 40 microns, 33 microns, or 20 microns or less in diameter, and the sparse path code can still be decoded. The sizes of the full sparse path codes shrink accordingly, which can result in overall code lengths of less than 1 mm, as contrasted with codes on the order of 20 mm in length in the prior art. (Still smaller scales can be achieved if camera resolutions finer than 150 pixels per inch are used.)

Figure 19:
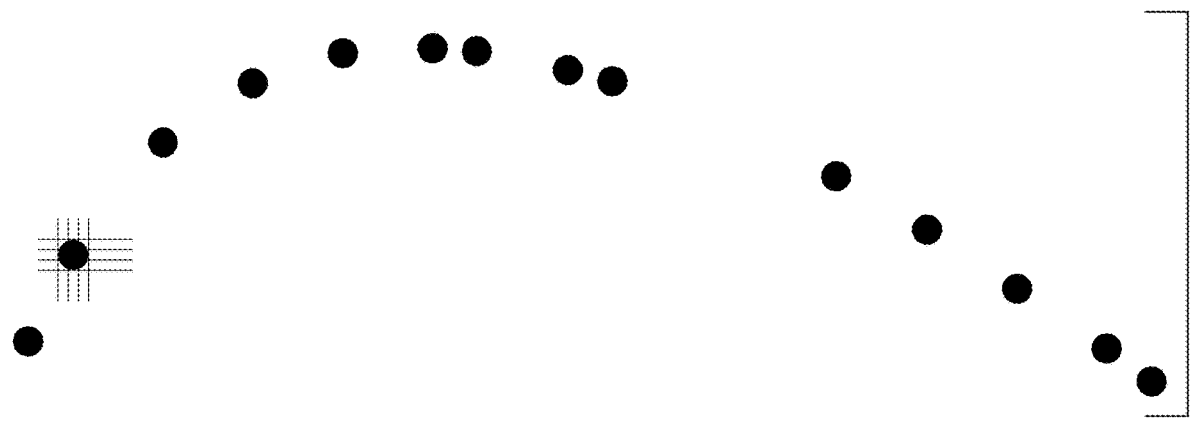
FIG. 19 is an enlarged view of a prior art sparse path code.

To illustrate, FIG. 19 is a greatly-enlarged illustration of a prior art sparse path code, based on FIG. 4A. (It is illustrated at about eight-times actual size.) On the left, one of the dots is shown with an overlaid pixel sampling grid. Each square in this grid represents the area sampled by a single camera photosensor pixel. In an illustrative embodiment, each such square is 170 microns in width. So the depicted dots are about 500 microns in width, and the actual code has an overall dimension of about 20 mm.

Figure 20:
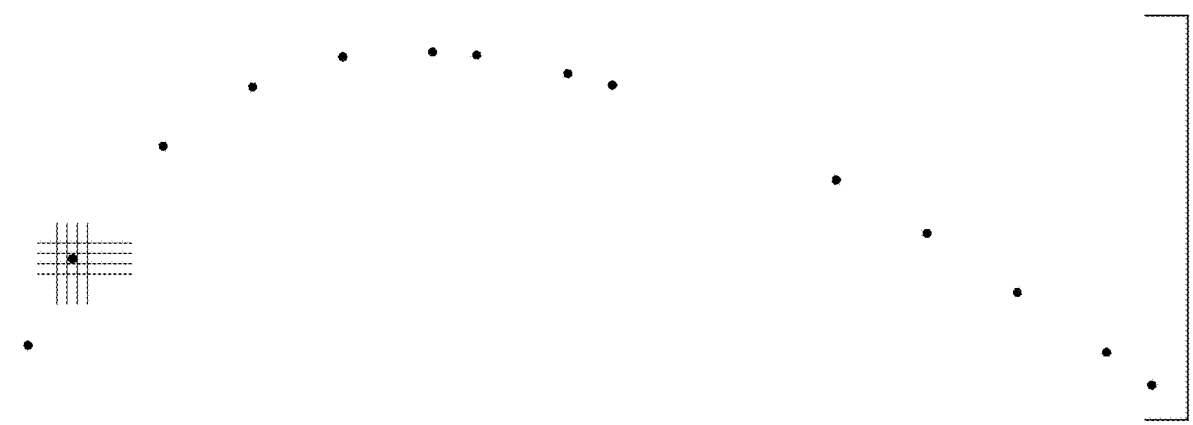
FIG. 20 is an enlarged view of a sparse path code incorporating certain aspects of the present technology.

In accordance with an aspect of the present technology, each dot can be made smaller—to the scale of a single pixel sampling area, or smaller. FIG. 20 shows the code of FIG. 19 composed, instead, of dots that are about 150 microns in width. The sampling grid at the left is shown as before, with each square being 170 microns across. As before, this illustration of the sparse path code is about eight-times actual size.

Figure 21:
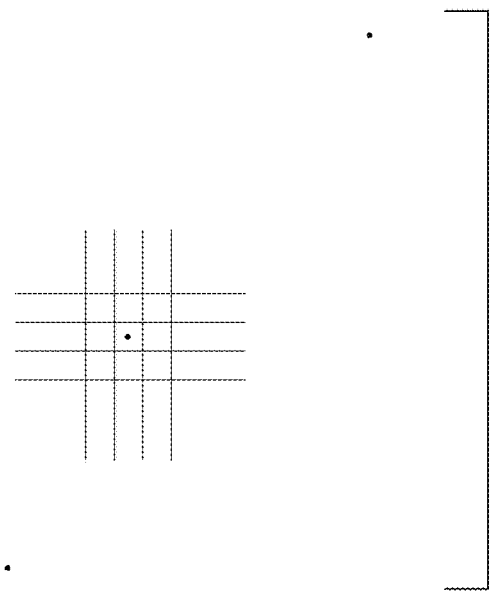
FIG. 21 is an excerpt of an enlarged view of a sparse path code incorporating aspects of the present technology.

FIG. 21 shows an excerpt of the code of FIG. 19 composed, instead, of dots that are about 30 microns in width. To illustrate such small features, the excerpt is shown in magnified form—magnified by a factor of 2.7, relative to FIGS. 19 and 20, i.e., about 22-times actual size. (Only three dots are shown, due to the magnification employed.) The overlaid grid (now magnified) is again composed of cells that are 170 microns across.

Figure 22:
FIG. 22 is an enlarged view of a sparse path code incorporating aspects of the present technology, but with disproportionately large dots to aid their visibility in the printed patent.

FIG. 22 shows the sparse path code of FIG. 19, at the same scale as FIG. 19 (i.e., about eight-times actual size), except the dots are disproportionately larger to make them visible. Commensurately small-sized codes of other forms (e.g., closed-path) can similarly be realized.

As is evident, the code of FIG. 22—even with disproportionately-large dots—is very much smaller, and less conspicuous, than the code of FIG. 19. This permits many more such codes to be marked within a given surface area, improving reading robustness.

Applicant has found that the limitation on code size does not seem dependent on dot size; a dot of virtually any size can provide some measure of detectable contrast difference. Rather, the limiting factor seems to be that the imagery submitted for decoding should have a pixel scale (pitch) on the order of the minimum distance between dots. That is, if the code is imaged at a resolution of 150 pixels per inch (i.e., each pixel spans an area of 170 microns on a side), then the dots are desirably spaced at least 170 microns apart. This assures that no single pixel luminance will be influenced by more than one dot. (Experience actually indicates that if error correction is used, a spacing of 80% of the pixel pitch can be sufficient; that is, the dots may be spaced just 136 microns apart, in the example just-given.)

To achieve dots of the just-mentioned small sizes, it is typically necessary to employ more accurate shaping technologies than the types of molding commonly used with plastic drink bottles and the like (e.g., blow-molding). One suitable technology to create fine features on plastic is injection molding. In such methods, a viscous plastic is injected into a mold cavity, and high pressure is applied (usually in excess of 5,000 PSI, and typically in excess of 10,000 PSI). The mold (which may be steel, aluminum, titanium or beryllium-copper alloy) is precision-machined, e.g., by laser, photolithography or spark erosion, to define very fine features.

Further, applicant has found that it is not necessary to use relief features for the dots, as was described above. Instead, regions can simply be textured, e.g., to have a matte finish, which visibly contrasts with a polished (smooth) finish of surrounding areas. The mold's original smooth surface finish may have a roughness average of less than 2 microns, and more typically has a roughness of less than 1.0, 0.4, 0.1, 0.05 or 0.02 microns. A suitable visible contrast can be achieved by forming a surface roughness that is just 1.5 times that of the original smooth surface finish.

Typically, larger contrast is desired, so shaping (e.g., by laser) to achieve surface roughness in the dot areas that is 2, 5, 10 or 20 or more times the original metal roughness may be used. In one example, the original surface roughness average is 0.3 microns, and the textured roughness within the dot area is in the range of 0.6 to 3 microns. In another the original surface roughness is 0.1 microns, and the textured roughness is in the range 0.4 to 2 microns. These, of course, are just a few among countless variations. The guiding principle is contrast, with more being preferred.

At some point, surface roughness goes beyond what might be regarded as a matte texture into a more distinct 3D shaping of the surface. This is a subjective distinction, but the transition might be regarded as somewhere between 3 and 20 microns, e.g., 5 or 10 microns. Relief features of smooth shape, such as hemispheres, can be employed. Alternatively, different shapes can be machined. For example, the marked dots can be circular areas at a lower, stepped-down, level compared to the original mold surface. The base, or floor, of this stepped-down lower level is typically roughened by the machining (e.g., laser) action, and so is not as smooth as the original metal surface. Its roughness average may be in the range of matte surfaces noted above, or greater. The average level of the floor can differ from the average level of the original surface by, e.g., 3, 5, 10 or more microns. The textured surface of the floor can effect scattering of incident light, providing a contrast distinction to locations left unmarked, with their original metal finish. The depression of the marked dots also introduces shadowing, which can further aid in producing visible contrast and helping code detection (i.e., the side walls of such stepped-down cells can shadow regions of the floor from incident light). Laser-machining of such stepped-down cells, however, takes longer than forming a matte finish, and the larger 3D effect may be aesthetically undesirable in certain molded parts.

Still further, each "dot" can include multiple features. That is, instead of the entire area of a dot being machined (e.g., textured with a matte finish), multiple features are marked within the boundary of the dot, such as an array of dots or other shapes. Each shape can be marked to have a light scattering features (e.g., comprising a texture finish), as described above.

To aid discussion, consider a single dot that is 160 microns across within a sparse path code. The dot may span a square area, instead of round. A laser can mark fine features within such a region. FIG. 23 shows a virtual division of such a dot into an array of 64 sub-cells, each 20 microns on a side. Each of these sub-cells can be marked, e.g., by a laser forming a region of matte finish. The regions can be circular, as shown in FIG. 24A, and each can fill a sub-cell. Alternatively, each can be larger or smaller than a sub-cell, as shown in FIGS. 24B and 24C.

Figure 25:
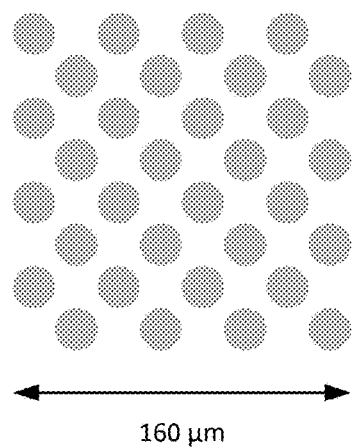
FIG. 25 illustrates that the sub-cells of the dot of FIG. 23 can be marked in a checkerboard pattern.

Not all of the 64 sub-cells need to be marked. For example, alternating sub-cells can be marked, yielding the checkerboard patterns of FIG. 25. The total marked area of this "dot" is half that of the corresponding dots shown in FIG. 24A-24C. Thus, the diffuse reflection is halved, while the specular reflection (from the original smooth mold surface) is increased.

Figure 26:
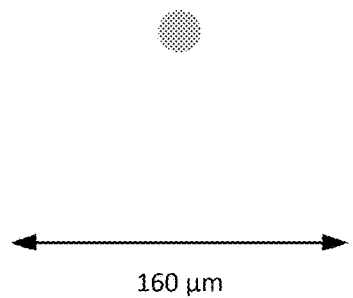
FIG. 26 illustrates that a single sub-area within a dot region can be marked, e.g., with a mark that is 20 microns in diameter.
Figure 27:
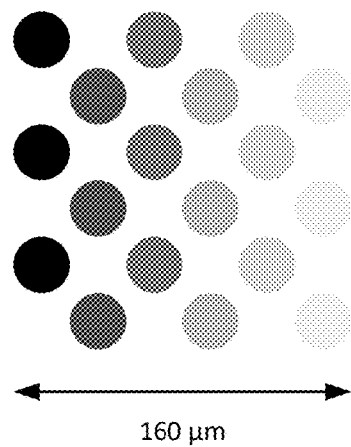
FIGS. 27-32 illustrate that sub-cells corresponding to a sparse path code dot can be marked with features of different size, shape, and/or surface roughness or depth.
Figure 28:
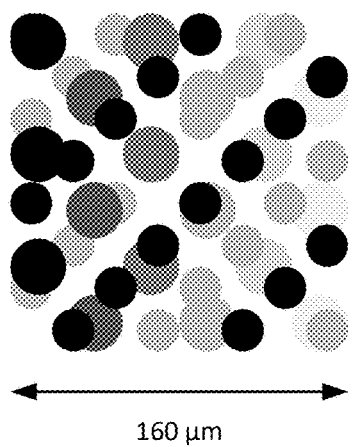
Figure 29:
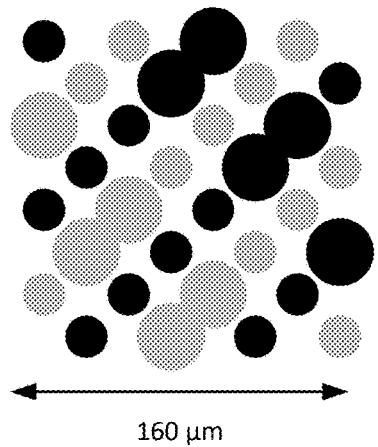

The features marked within a cell naturally don't have to be centered in sub-cells of the 8×8 array shown in FIG. 23; they can be anywhere. The markings can be symmetrical around a vertical axis, or symmetrical around a horizontal axis, or symmetrical around one or both diagonal axes, or combinations of those, or none of those. The markings can include features of different sizes. In some arrangements a "dot" can be represented by a single matte-textured sub-cell, as shown in FIG. 26.

Figure 30:
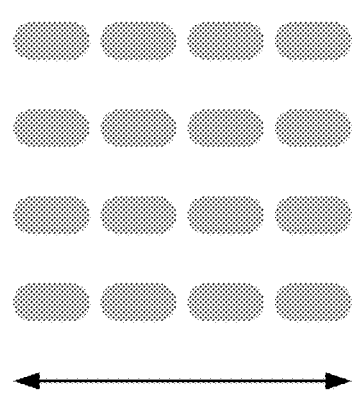
Figure 31:
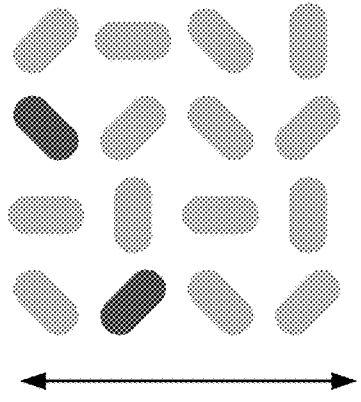
Figure 32:
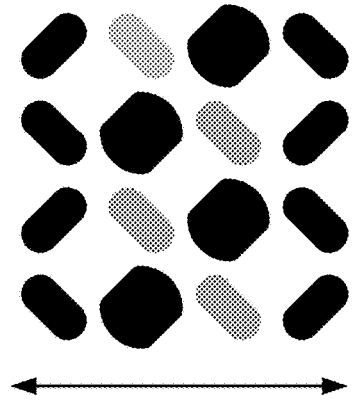

Different features within a cell can be shaped (e.g., laser-formed) with different effects, such as different roughness averages, or different step-down depths. FIGS. 27-32 illustrate, with features of different darkness indicating markings of different surface roughness or depth, or combinations thereof. As shown, the features do not need to be round. By moving a laser while energized, elongated features can be formed, as shown in FIG. 30. The speed of movement, laser focus and laser power can also be modulated to vary the feature characteristics. The features within a cell can have their primary axes oriented in two or more different directions, as shown in FIGS. 31 and 32. The features can also have random aspects, e.g., in orientation, size, and/or roughness/depth (as shown in FIG. 31).

Figure 33:
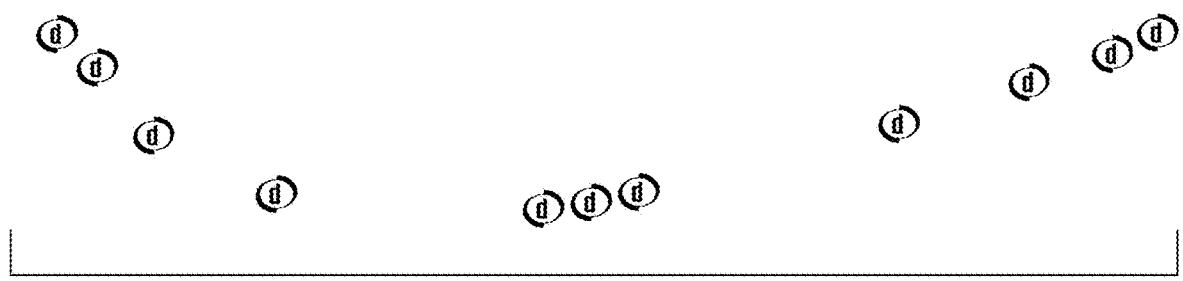
FIG. 33 shows that marks comprising a sparse path code can take various shapes, such as logos.

Instead of using simple graphic primitives such as circles and elongated shapes, one or more of the dots in a sparse path code can comprise logos, text, or other bitonal graphics, formed on the molding plate with a surface finish different than surrounding metal. FIG. 33 shows the dot path of FIG. 4A code in which each of the dots has the form of a company logo. Similarly, sub-cell markings, e.g., as illustrated in FIGS. 24A-32, can be formed by such graphics. Such logos and other fine detail injection-molded marks can serve as anti-counterfeiting features, since they are difficult for a counterfeiter to reproduce inexpensively.

Reference was made to surface roughness as providing visible contrast with the surrounding, original mold surface. Roughness is one parameter on which contrast (e.g., light dispersion by diffuse scattering, vs. reflection) depends, with rougher surfaces typically scattering more light. (At extremes, however, deep cavities appear in the surface, which cause shadows, which counteracts the desired diffusion of light.) But roughness is not the only operative variable. There is also spatial frequency. If surface features are analogized to rough mountains and valleys, then the greater their number, the more light will be diffused. In contrast, a single mountain in an area, surrounded by flat plain, will have less diffusion and more reflection. Size of the features is another variable on which the amount of light diffusion depends.

Thus, in establishing different texture patterns with different degrees of light diffusion, progressively-decreasing signal values do not always correspond to progressively-decreasing roughness (or progressively-decreasing spatial frequency, or feature size). In some instances, less light diffusion may be achieved by increasing the surface roughness, but diminishing the spatial frequency. Etc.

Injection molds may be fashioned from 420FM steel, D2 tool steel, or 304 stainless steel. The compositions of such alloys are familiar to artisans. For example, 420RM includes 0.28-0.38% carbon, ≤1% silicon, ≤1.4% manganese, ≤0.03% phosphorous, 0.5-1% sulphur, 15-17% chromium, ≤1% nickel. Popular aluminum and titanium alloys include 6061 aluminum and titanium 6Al-4V (5% aluminum and 4% vanadium). Ceramic molds can also be employed.

Earlier-cited patent application Ser. No. 17/835,775 details further aspects of injection molding code markings on plastic. The teachings of such patent application are applicable to the sparse path code arrangements detailed herein.

In other embodiments, the features of sparse path codes are not produced by molding, but rather by laser-etching of a plastic (or other item) itself. A laser beam can be steered in x/y directions by orthogonal mirrors, and controlled to inscribe any desired pattern on the surface of a plastic item. Using a beam-splitter, the same pattern can be formed at multiple locations on an item simultaneously (or on multiple items).

Still another embodiment uses a digital light projection (DLP) mirror array to re-direct illumination from a laser to multiple positions on a workpiece—allowing simultaneous etching of plural complete sparse path codes on an item in a single exposure. A conveyor can position an item into an exposure zone, the laser is energized, the DLP array scatters the light into the desired pattern, and the item is etched. When the marks have been adequately formed (e.g., foamed), the conveyor advances another item into position and the process repeats. The mirror pattern can be reconfigured between exposures to effect serialization, if desired.

A suitable DLP array is the DLP650LNIR, which has 1280×800 resolution, an optical power-handling capability of 500 watts per square centimeter, and optics suited for switching light from a 10.6 µm carbon dioxide laser. Such DLP can be controlled by the companion DLPC410 controller chip. Both devices are available from Texas Instruments.

In some such arrangements the item is stationary during laser-marking; in others the item is rotated around an axis—limiting the extent of travel the laser must steer. Such direct laser marking of plastic items permits serialization, by which each item is marked with a unique code. The codes can be of conventional size (e.g., with each dot about 500 microns in width), or codes employing smaller features (as just-described) can be realized.

Cited patent publication 20210390358 details further aspects of direct laser marking of items. The teachings of such document are applicable to the sparse path code arrangements detailed herein.

Further Embodiments

While reference was made, on the first page, to related patent documents, and the use of the presently-described technology therein, it bears repeating. The present disclosure expressly teaches embodiments in which elements from the present disclosure are incorporated into systems described in those documents, and vice-versa (e.g., replacing watermarks and their data, with sparse path codes and their data, etc.).

By way of further illustration and not limitation, a plastic recycling system in accordance with one exemplary arrangement places items marked with sparse path codes (instead of digital watermark codes) on a conveyor belt traveling at 3-5 meters per second, under an array of cameras spaced across the belt. The cameras capture image frames at a rate of 300 frames per second, synchronously with flashes of light from LED illumination units. This yields multiple images of each item on the belt (e.g., with the belt advancing about 1 cm between frames). Portions of the belt that do not have items can be sensed, and corresponding image data is then not processed for extraction of codes from marked items. Imagery depicting items (not empty belt) is processed to extract the payload data represented by the message data, as described above.

In some arrangements, image exposures are captured with alternating intensities of light (or lengths of exposures) to yield image frames that are variously under- and over-exposed. Code extraction can be attempted on each frame, with the differing exposures enabling codes to be successfully extracted that might otherwise not be read.

When payload data is extracted from imagery depicting an item, the data may directly convey metadata about the item, or it may provide an identifier that enables access to associated item metadata in a database. In addition to plastic type, such metadata can include whether the item was a container for a food product or non-food, whether the item is a composite of plural plastic types (e.g., a base bottle of one plastic sheathed in a sleeve of a different plastic), whether the plastic is virgin or previously-recycled, the producer of the item, etc. Based on the belt position at which an item is detected, and knowing the belt speed, a calculation is made as to when the item will reach a row of air-jets, which are then selectively activated to deflect certain items out of the waste flow into one or more collection bins (e.g., for particular plastic types, and/or to sort food containers from non-food containers, or to separate sleeved containers from other containers, or virgin from non-virgin plastics, etc.).

Ejection accuracy is aided if the store of item metadata accessed using the extracted item code includes weight data for the item. Higher air pressure can then be applied to eject a 50 gram item than a 5 gram item.

The dimensions of an item can also be among the accessed metadata. Physically larger items can be ejected using higher air pressures than physically smaller items.

Once an item has been identified by an extracted code, the physical extent of the object on the belt can be assessed by region growing techniques, e.g., a blob analysis that extends an estimated contour of the item to encompass additional incremental contiguous areas that have a common attribute, until a transition is encountered that is consistent with a boundary of the item (such as a change in the attribute, an image edge, etc.). The air jet activation can then target the apparent center of mass of the item. For more in this regard, see the disclosure of earlier-cited application Ser. No. 17/721,694.

The capture of multiple images of an item as it passes under the camera(s) enables the system to determine whether the item is traveling at a different speed (and direction) than the belt, in which case selection and timing of operation of an air-jet can be adjusted to reflect such rolling movement.

Sometimes a sparse path code is printed on a non-plastic surface of an item to indicate a type of plastic incorporated elsewhere in the item. An example is a plastic coffee cup sheathed in a fibrous paper insulating wrapper. The wrapper can be printed with a code indicating the type of plastic within.

Extraction and use of data from sparse path codes can be used in combination with item data determined using near infrared (NIR) spectroscopy, and/or analysis of imagery by artificial intelligence (AI) techniques, e.g., using convolutional neural networks. Such cooperative use of technologies is detailed in the earlier-cited documents. For example, if different of these systems reach different determinations about an item (e.g., its plastic type), then the conflict can be resolved by the methods detailed in the cited documents.

In some such embodiments, a sparse path code conveys one type of information about an item, and NIR or AI analysis reveals another type of information about the item. The item can be processed (e.g., sorted) based on the combination of information.

For example, a sparse path code may indicate that an item is a food container (as opposed to a non-food container). An NIR system may indicate the item is formed of PET plastic. Such item can be ejected into a bin in which PET food containers are collected, i.e., based on both determinations. Similarly, a sparse path code may indicate that an item is a PVC food container, and an AI system may conclude the container is dirty (or has a cap still on the container). Such item can be ejected into a bin in which dirty PVC food containers (or capped PVC food containers) are collected. Etc.

Relatedly, an AI system may perform region labeling on captured image data depicting an area of belt. It may identify, for example, that one sub-area is occupied by an aluminum can, another is occupied by a wad of newspaper, and a third sub-area is occupied by a plastic bottle. A sparse path code detector may then process only imagery depicting the third sub-area, disregarding the other areas.

The same AI system, or another, may classify items on a conveyor belt in terms of their crumpledness. For example, such system can indicate excerpts of imagery that depict relative un-distorted item surfaces. A sparse path code detector may then process only such image excerpts—disregarding image excerpts where code extraction is improbable due to surface distortions.

In some implementations, the camera data that is used for sparse path code extraction is also used for other purposes, e.g., AI analysis, NIR spectroscopy, and/or determining item extent by region-growing.

Some items may have sparse path codes formed by relief features (i.e., in the item substrate), and have other machine readable codes formed by printing (e.g., on item labels). The latter codes may, themselves, be sparse path codes. Such other codes may be printed with yellow ink to reduce visibility, and may be made readily detected by computer vision systems through use of blue illumination. (Alternatively, sparse or continuous-tone watermark codes can be employed, e.g., as detailed in U.S. patent publication 20190332840.)

In addition to yellow ink, sparse codes can be printed with, e.g., clear varnish (or other clear topcoat) and with nearly-white ink. See pending patent application Ser. No. 17/833,683, filed Jun. 6, 2022, and patent document 10,580, 103, respectively.

In some embodiments, sparse path code reading is performed on captured imagery as described above, and is also attempted based on a left-for-right mirrored counterpart of the imagery, and may also be attempted on a black-for-white inverted counterpart of the imagery—taking into account possible alternative presentations of marked items in the imagery.

A sparse path sync code (including a start or stop code) may be designed to have a distinctive characteristic in a transform domain by which it can readily be detected (rather than a pattern of dots that appears distinctive in the pixel domain). For example, captured imagery can be transformed into the Fourier domain (e.g., by an FFT), using overlapping 32×32 pixel blocks, and analyzed for a distinctive pattern that signals the presence, and/or position/pose/orientation, of the sync code. Transform of image data into the Fourier-Mellin domain, and associated sync analysis, can likewise be performed.

The marks comprising the codes can be formed by molding. The relief features may have vertical dimensions, relative to the item surface, of between a fraction of a micron and a millimeter or so (sometimes more), depending on application and forming technology. Code features in a plastic mold can be formed by drilling, laser-processing, chemical etching, spark erosion, or other machining method. Desirably, if indentations are formed in a mold, some or all of the indentations are vented to the atmosphere (with unvented indentations linked to vented indentations via a network of channels on the mold surface).

Sometimes plastic items are textured (e.g., by molding) with reciprocal code patterns on opposite surfaces of the item (e.g., both surfaces of the bottom of a tray or yogurt container) by two reciprocally-shaped mold surfaces—enabling the code to be sharply defined on both sides, assuring reliable reading from either side. Even without such reciprocal molding, a pattern molded onto one surface can generally be read from the other if the dots have visible artifacts on the non-molded surface. A representative example is a thermoformed tray having a wall thickness of 0.2-0.4 mm, formed of opaque (black) PET plastic, and shaped with indentations or protrusions that are 170 microns or larger in diameter.

Figure 34:
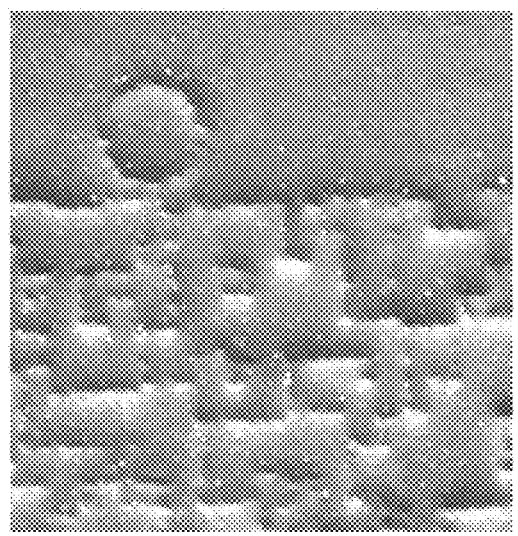
FIG. 34 illustrates how ridges, crevices or divots can result from forcing viscous plastic into mold holes under pressure.

Often viscous plastic does not simply form a hemispherical dome when it extends into a circular mold depression (which may be cylindrical in 3D shape). Instead, a feature resulting from the molding is often an impressed ridge, crevice or divot that is formed (typically irregularly) along the entrance to the depression, along the periphery of the indentation, where the plastic passes a ninety-degree precipice into the cavity. Such a divot extends into the molded plastic surface, in a direction opposite the protruding dot. An example is shown in the upper left of FIG. 34. (FIG. 34 also shows other such divots resulting from edges of rectilinear cavities in the mold). Such divot feature has been found to aid signal representation, by increasing optical detectability of the dot element (as compared with a dot element shaped by a mold with a tapered entrance, designed to avoid such divot feature).

Plastic can be shaped from protrusions extending out from a mold instead of indentations extending into the mold. Such structures can be formed, e.g., by chemically-etching, laser-etching, or otherwise milling away a top surface of the mold, except at locations where the spikes are to remain. By use of molding spikes, protrusions are not formed on the surface of the resin sheet that is in contact with the mold, but rather on the non-contact surface; the contact surface has spike-formed depressions instead.

The mold surface may be processed (e.g., by dry ice- or sand-blasting) to roughen its surface finish to a small degree, e.g., to aid item release. The magnitude of such surface roughness is typically less than 10% of the variation in surface level caused by the code signal.

Again, the cited documents have further details concerning the foregoing.

CONCLUDING REMARKS

Having described and illustrated the principles of our work with reference to illustrative embodiments, it will be recognized that the technology is not so limited.

For example, while the emphasis has been on sorting plastic items for recycling, it will be understood that the use of sparse path codes is virtually without limit. Even within the sorting field the technology has many applications, such as in sorting packages on a conveyor in a warehouse or a shipping facility.

While reference was made to generating the message bits of an encoded payload by applying block coding, or convolutional coding, to payload data, other error-correcting techniques can be used. Examples include BCH, Reed Solomon, and turbo codes.

Reference was made to calculating dot products to determine whether a string of message bit data is closer to one string of bits, or to another. Instead of a dot product, such evaluation can be conducted otherwise, e.g., by correlation, or simply by determining the number of bit values in one string that match counterpart bit values in the other string.

Although the detailed codes include sync portions, this is not always required. In some embodiments the bits comprising the message data have certain attributes that are invariant (e.g., certain bits are always found at certain positions), in which case such attributes of the message data can be used as sync information. Relatedly, in sparse path codes in which marks are formed in a closed contour (e.g., a circle), it is not essential to have a sync feature to signal the start, or end, of the code within the continuous sequence. Instead, the sequence of sensed marks can be submitted to the decoder in each of its possible forms (i.e., starting with each possible starting location, and proceeding in each possible direction). Due to the error-sensing or -correcting coding that is desirably used, the correct sequence will be the only one that produces valid output data.

Figure 36:
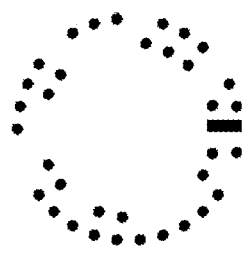
FIGS. 36 and 37 show two further sparse path codes embodying aspects of the present technology.
Figure 37:
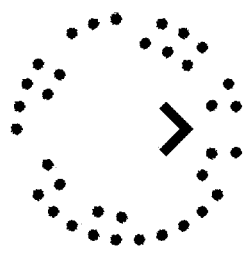

The sync marking need not be an array of dots. It can be any other shape. An example is a line segment extending between two dot locations, as illustrated in FIG. 36. While the illustrated line segment is positioned within the concentric circular paths followed by the dots, it can be elsewhere, such as in the center of the code, or offset from the center. FIG. 37 shows a different shape that serves as a sync marker to indicate the starting position of the code, positioned at a location offset from the center of the code.

It will be understood that the candidate dot locations can be positioned at any locations that can be mathematically ascertained, so as to permit decoding. Usually, the dot locations are spaced at uniform linear distances along a path, or at uniform angular spacings from a center point (e.g., the center of a circular code), but these are not requirements.

Although the use of neural networks was primarily discussed in the context of reading codes having start and stop dot sequences, it will be understood that such neural network methods are applicable to all of the embodiments detailed herein.

While the probability metrics referenced earlier typically employed three dot locations (e.g., a middle, fixed dot location, and a dot location on either side), probability metrics can be derived otherwise, such as by employing two locations. For example, if an encoded payload bit is represented twice—once as a dot and once as a void—then a difference between (a) the average value of a small pixel region centered on one of the two locations, and (b) the average value of a small pixel region centered on the other of the two locations, can serve as a probability measure for that encoded bit, with larger values being better. Similarly, if an encoded payload bit is represented only once, by a dot, then a contrast measure between the average value of a small pixel region centered on the dot location, and the average value of a small pixel region centered away from the dot location, can be used as a confidence measure.

Instead of using average values, other embodiments can employ other measures, such as the maximum value within each pixel region, or the minimum value within each pixel region, or the variance within each pixel region, etc. The two locations can be adjoining, or they may be spaced-apart in the code, depending on implementation.

Applicant favors use of pixel regions larger than a single pixel, both in the metrics just-mentioned, and in distinguishing dots from voids. As exemplified by FIG. 21, single pixel values can vary widely at and around a dot. In some embodiments of the present technology, however, single pixel values can be used.

The use of sequences of three or four dots in a row as a sync symbol aids in explanation, but can be sub-optimal in practice. In many embodiments, different and/or longer sync sequences are employed.

While the focus of this disclosure has been on marking plastic items (e.g., packaging for retail food items), the technology is more broadly applicable and extends to marking items of other materials (e.g., glass, and metal) and for other purposes.

Figure 35:
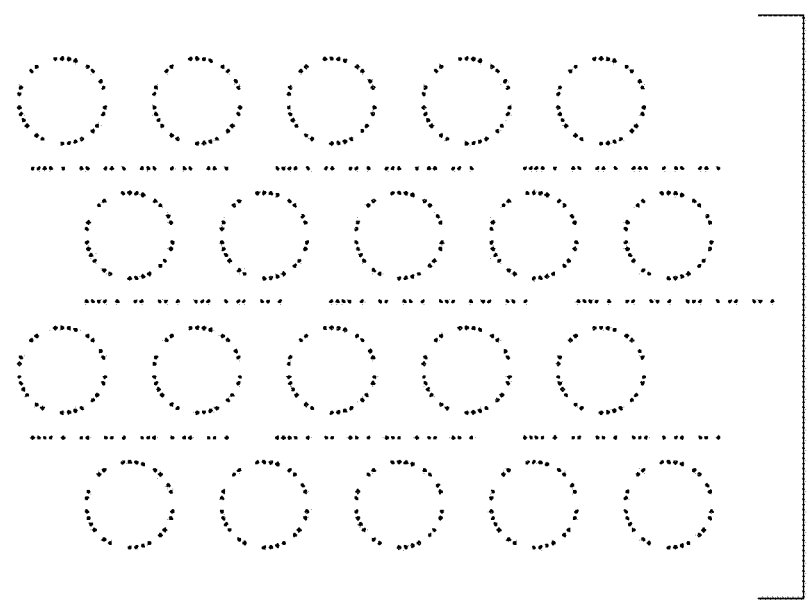
FIG. 35 illustrates how a multitude of codes can be used to mark a single item.

It will be understood that items are usually redundantly marked with a multitude of codes, in a random or structured array. FIG. 35 illustrates one such array, including codes of two different formats. Codes of the two different formats can convey the same data, or different data. In some embodiments, the codes form graphic primitives that are assembled into aesthetically-pleasing patterns or human-recognizable artistic images.

While codes can comprise marks placed along plural different lines (e.g., concentric or parallel, as shown in FIGS. 12 and 17), the codes become more visible as more such lines are employed. In typical application, no more than two such lines are used. In some instances, three or more such lines can be used. However, in such embodiments the lines are desirably closely-spaced, so that the maximum distance between the lines is less than, e.g., 20% of the length of either line, and preferably 10% or less. (In FIG. 17, this figure is about 10%.)

It will be recognized that in certain of the operations identified above, it is necessary to determine pixel values at locations in-between camera sensor values. For example, based on the dot spacing interval discerned from a sync code (as possibly refined by actual locations of other dots along the code), it may be discovered that a next dot's expected location is centered at non-integer pixel coordinates in the image space. A variety of techniques can be employed to determine a hypothetical pixel value at (or multiple hypothetical pixel values around) such location, including bilinear resampling, bicubic resampling, and Lanczos resampling. A simple technique computes a weighted sum of the four camera sensor pixels nearest to the desired sampling point. d While the detailed embodiments concern messages comprised of binary symbols, it will be recognized that messages can be composed otherwise, e.g., of ternary values (as may be represented by indentations, protrusions, and voids, or black/white/grey) or quaternary values, etc.

In embodiments in which codes are read from items on a conveyor belt, a 3D camera (such as an Intel RealSense 435 stereo vision-based system, with a global shutter image sensor that can operate at speeds up to 300 frames per second) can be used to determine the orientation of item surfaces. If a surface is angled 30 degrees relative to the horizontal conveyor, any code on that surface will appear fore-shortened in the direction of tilt. The detector can make use of such surface orientation information to adapt its search for a sync code, and its estimation of a reading path accordingly. For example, a circular closed-path code on such a surface will appear as an ellipse, with the short dimension in the direction of tilt, and with a ratio between the length of the minor axis and the length of the major axis of 0.5.

Although the detailed codes are illustrated as employing dots for their marking primitives, it should be understood that marks of other forms, such as line segments, stars, or other features, can alternative be used.

Applicant has found that droplets of water and other liquids on marked plastic items can sometimes be mistaken for code dots. Accordingly, it is desirable to assure that the plastics are dry. This can be aided by industrial dryer technology that passes dry, heated air through or by the items to be sorted, either while they are in a bin awaiting sorting, or when they are introduced on the conveyor belt.

Reference was made to forced air blowout as one means for diverting an item from a material flow, such as from a conveyor belt. A particular air blowout arrangement is detailed patent publication US20190070618 and comprises a linear array of solenoid-activated air jet nozzles positioned below the very end of a conveyor belt, from which location items on the belt start free-falling under the forces of gravity and their own momentum. Without any air jet activity, the items cascade off and down from the end of the belt, and into a receptacle or onto another belt positioned below. Items acted-on by one or more air jets are diverted from this normal trajectory, and are diverted into a more remote receptacle—typically by a jet oriented to have a horizontal component away from the belt, and a vertical component upwards. Other systems use robotic arms with mechanical grippers or vacuum suction to pick items from a material stream and toss them into bins or onto other conveyors. These and other separation and sorting mechanisms are known to the artisan, e.g., from U.S. Pat. Nos. 5,209,355, 5,485,964, 5,615,778, 20040044436, 20070158245, 20080257793, 20090152173, 20100282646, 20120031818, 20120168354, 20170225199 and 20200338753. Operation of such diverters is controlled as indicated above.

It will be understood that the methods and algorithms detailed above can be executed using computer devices employing one or more processors, one or more memories (e.g. RAM), storage (e.g., a disk or flash memory), a user interface (which may include, e.g., a keypad, a TFT LCD or OLED display screen, touch or other gesture sensors, together with software instructions for providing a graphical user interface), interconnections between these elements (e.g., buses), and a wired or wireless interface for communicating with other devices.

The methods and algorithms detailed above can be implemented in a variety of different hardware processors, including a microprocessor, an ASIC (Application Specific Integrated Circuit) and an FPGA (Field Programmable Gate Array). Hybrids of such arrangements can also be employed.

By microprocessor, applicant means a particular structure, namely a multipurpose, clock-driven integrated circuit that includes both integer and floating point arithmetic logic units (ALUs), control logic, a collection of registers, and scratchpad memory (aka cache memory), linked by fixed bus interconnects. The control logic fetches instruction codes from an external memory, and initiates a sequence of operations required for the ALUs to carry out the instruction code. The instruction codes are drawn from a limited vocabulary of instructions, which may be regarded as the microprocessor's native instruction set.

A particular implementation of one of the above-detailed processes on a microprocessor—such as locating a sync code—involves first defining the sequence of algorithm operations in a high level computer language, such as MatLab or C++ (sometimes termed source code), and then using a commercially available compiler (such as the Intel C++ compiler) to generate machine code (i.e., instructions in the native instruction set, sometimes termed object code) from the source code. (Both the source code and the machine code are regarded as software instructions herein.) The process is then executed by instructing the microprocessor to execute the compiled code.

Many microprocessors are now amalgamations of several simpler microprocessors (termed "cores"). Such arrangement allows multiple operations to be executed in parallel. (Some elements—such as the bus structure and cache memory may be shared between the cores.)

Examples of microprocessor structures include the Intel Xeon, Atom and Core-I series of devices, and various models from ARM and AMD. They are attractive choices in many applications because they are off-the-shelf components. Implementation need not wait for custom design/fabrication.

Closely related to microprocessors are GPUs (Graphics Processing Units). GPUs are similar to microprocessors in that they include ALUs, control logic, registers, cache, and fixed bus interconnects. However, the native instruction sets of GPUs are commonly optimized for image/video processing tasks, such as moving large blocks of data to and from memory, and performing identical operations simultaneously on multiple sets of data. Other specialized tasks, such as rotating and translating arrays of vertex data into different coordinate systems, and interpolation, are also generally supported. The leading vendors of GPU hardware include Nvidia, ATI/AMD, and Intel. As used herein, Applicant intends references to microprocessors to also encompass GPUs.

GPUs are attractive structural choices for execution of certain of the detailed algorithms, due to the nature of the data being processed, and the opportunities for parallelism.

While microprocessors can be reprogrammed, by suitable software, to perform a variety of different algorithms, ASICs cannot. While a particular Intel microprocessor might be programmed today to discern affine pose parameters from a watermark reference signal, and programmed tomorrow to prepare a user's tax return, an ASIC structure does not have this flexibility. Rather, an ASIC is designed and fabricated to serve a dedicated task. It is purpose-built.

An ASIC structure comprises an array of circuitry that is custom-designed to perform a particular function. There are two general classes: gate array (sometimes termed semi-custom), and full-custom. In the former, the hardware comprises a regular array of (typically) millions of digital logic gates (e.g., XOR and/or AND gates), fabricated in diffusion layers and spread across a silicon substrate. Metallization layers, defining a custom interconnect, are then applied—permanently linking certain of the gates in a fixed topology. (A consequence of this hardware structure is that many of the fabricated gates—commonly a majority—are typically left unused.)

In full-custom ASICs, however, the arrangement of gates is custom-designed to serve the intended purpose (e.g., to perform a specified algorithm). The custom design makes more efficient use of the available substrate space—allowing shorter signal paths and higher speed performance. Full-custom ASICs can also be fabricated to include analog components, and other circuits.

Generally speaking, ASIC-based implementations of code detectors offer higher performance, and consume less power, than implementations employing microprocessors. A drawback, however, is the significant time and expense required to design and fabricate circuitry that is tailor-made for one particular application.

A particular implementation of any of the above-referenced processes using an ASIC, such as extracting finding and extracting message data from sparse path codes in received imagery, again begins by defining the sequence of operations in a source code, such as MatLab or C++. However, instead of compiling to the native instruction set of a multipurpose microprocessor, the source code is compiled to a "hardware description language," such as VHDL (an IEEE standard), using a compiler such as HDLCoder (available from MathWorks). The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.)

A third hardware structure that can be used to execute the above-detailed algorithms is an FPGA. An FPGA is a cousin to the semi-custom gate array discussed above. However, instead of using metallization layers to define a fixed interconnect between a generic array of gates, the interconnect is defined by a network of switches that can be electrically configured (and reconfigured) to be either on or off. The configuration data is stored in, and read from, an external memory. By such arrangement, the linking of the logic gates—and thus the functionality of the circuit—can be changed at will, by loading different configuration instructions from the memory, which reconfigure how these interconnect switches are set.

FPGAs also differ from semi-custom gate arrays in that they commonly do not consist wholly of simple gates. Instead, FPGAs can include some logic elements configured to perform complex combinational functions. Also, memory elements (e.g., flip-flops, but more typically complete blocks of RAM memory) can be included. Likewise with A/D and D/A converters. Again, the reconfigurable interconnect that characterizes FPGAs enables such additional elements to be incorporated at desired locations within a larger circuit.

Examples of FPGA structures include the Stratix FPGA from Intel, and the Spartan FPGA from Xilinx.

As with the other hardware structures, implementation of the above-detailed processes on an FPGA begins by describing a process in a high level language. And, as with the ASIC implementation, the high level language is next compiled into VHDL. But then the interconnect configuration instructions are generated from the VHDL by a software tool specific to the family of FPGA being used (e.g., Stratix/Spartan).

Hybrids of the foregoing structures can also be used to perform the detailed algorithms. One employs a microprocessor that is integrated on a substrate as a component of an ASIC. Such arrangement is termed a System on a Chip (SOC). Similarly, a microprocessor can be among the elements available for reconfigurable-interconnection with other elements in an FPGA. Such arrangement may be termed a System on a Programmable Chip (SORC).

Still another type of processor hardware is a neural network chip, e.g., the Intel Nervana NNP-T, NNP-I and Loihi chips, the Google Edge TPU chip, and the Brainchip Akida neuromorphic SOC.

Software instructions for implementing the detailed functionality on the selected hardware can be authored by artisans without undue experimentation from the descriptions provided herein, e.g., written in C, C++, Visual Basic, Java, Python, Tcl, Perl, Scheme, Ruby, Caffe, TensorFlow, etc., in conjunction with associated data.

Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems—special purpose computer systems in which operating system software and application software are indistinguishable to the user (e.g., as is commonly the case in basic cell phones). The functionality detailed in this specification can be implemented in operating system software, application software and/or as embedded system software.

Different of the functionality can be implemented on different devices. Different tasks can be performed exclusively by one device or another, or execution can be distributed between devices. In like fashion, description of data being stored on a particular device is also exemplary; data can be stored anywhere: tc.al device, remote device, in the cloud, distributed, etc.

Other recycling arrangements are taught in U.S. Pat. Nos. 4,644,151, 5,965,858, 6,390,368, 20060070928, 20140305851, 20140365381, 20170225199, 20180056336, 20180065155, 20180349864, and 20190030571. Alternate embodiments of the present technology employ features and arrangements from these cited documents.

This specification has discussed various embodiments. It should be understood that the methods, elements and concepts detailed in connection with one embodiment can be combined with the methods, elements and concepts detailed in connection with other embodiments. While some such arrangements are particularly described, many are not—due to the number of permutations and combinations. Applicant similarly recognizes and intends that the methods, elements and concepts of this specification can be combined, substituted and interchanged—not just among and between themselves, but also with those known from the cited prior art. Moreover, it will be recognized that the detailed technology can be included with other technologies—current and upcoming—to advantageous effect. Implementation of such combinations is straightforward to the artisan from the teachings provided in this disclosure.

While this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated (e.g., omitting various of the features of a complete system).

While certain aspects of the technology are described by reference to illustrative methods, it will be recognized that apparatuses configured to perform the acts of such methods are also contemplated as part of applicant's inventive work. Likewise, while other aspects are been described by reference to illustrative apparatus, and the methodology performed by such apparatus is likewise within the scope of the present technology. Still further, tangible computer readable media containing instructions for configuring a processor or other programmable system to perform such methods is also expressly contemplated.

To provide a comprehensive disclosure, while complying with the Patent Act's requirement of conciseness, applicant incorporates-by-reference each of the documents referenced herein. (Such materials are incorporated in their entireties, even if cited above in connection with specific of their teachings.) These references disclose technologies and teachings that applicant intends be incorporated into the arrangements detailed herein, and into which the technologies and teachings presently-detailed be incorporated.

In view of the wide variety of embodiments to which the principles and features discussed above can be applied, it should be apparent that the detailed embodiments are illustrative only, and should not be taken as limiting the scope of the technology.

The invention claimed is:

1. A plastic sorting method comprising the acts:
   reading a sparse path code defined by features on an item, from imagery of said item on a conveyor and depicting the sparse path code, the sparse path code following a curved line and comprising regularly-spaced candidate marking locations along the curved line at which said features are selectively placed, the reading producing information, in which the reading act includes extracting a bit sequence from the sparse path code, and computing a dot product between an extracted bit sequence, and each of plural candidate sequences, to produce said information by determining which of said plural candidate sequences is most likely to correspond to the extracted bit sequence;
   using produced information to determine that the item comprises an item of one plastic, sheathed in a sleeve of a second, different plastic; and
   diverting said item into a repository that contains other sheathed items.

2. The plastic sorting method of claim 1 in which said reading comprises applying the imagery to a network that includes one or more convolutional layers and that is configured to identify a location of at least a sync code portion of the sparse path code in the imagery.

3. The method of claim 1 in which the reading act includes applying a Laplacian filter, or plural Laplacian filters of different scales, to the imagery depicting the sparse path code.

4. The method of claim 1 in which the reading act includes examining the imagery depicting the sparse path code for pairs of features located within a predetermined pixel spacing.

5. The method of claim 1 in which the reading act includes determining a probability value for each sparse path code feature depicted in the imagery, based on a local contrast metric computed over a region centered on the feature, and performing soft-decision decoding employing determined probability values for said features in producing said information.

6. The method of claim 1 in which the sparse path code comprises a closed-path code.

7. The method of claim 1 wherein one of said features spans an area on said item that is X microns on a side, and a pixel in said imagery spans a camera focal plane region that is Y microns on a side, wherein the ratio X/Y is less than 1, 1/2, 1/4, or 1/8.

8. The method of claim 1 in which the features are 150 microns, 120 microns, 100 microns, 75 microns, 66 microns, 50 microns, 40 microns, 33 microns, or 20 microns or less in diameter.

9. A system for sorting plastic items, comprising:
   a conveyor having an item thereon;
   a camera system for capturing imagery depicting the conveyor with the item thereon;
   means for reading a sparse path code defined by features on the item, from captured imagery depicting the sparse path code on the item, the sparse path code following a curved line and comprising regularly-spaced candidate marking locations along the curved line at which said features are selectively placed, said means producing information, in which said means for reading a sparse path code includes means for extracting a bit sequence from the sparse path code and for computing a dot product between an extracted bit sequence, and each of plural candidate sequences, in producing the information by determining which of the plural candidate sequences is most likely to correspond to the extracted bit sequence;
   means for using produced information to determine the item comprises an item of one plastic, sheathed in a sleeve of a second, different plastic; and
   means for diverting said item into a repository that contains other sheathed items.

10. The system of claim 9 in which said means for reading comprises a network including one or more convolutional layers, in which the network is configured to identify a location of at least a sync code portion of the sparse path code in the captured imagery.

11. The system of claim 9 in which the means for reading a sparse path code includes means for applying a Laplacian filter, or plural Laplacian filters of different scales, to imagery depicting the sparse path code.

12. The system of claim 9 in which the means for reading a sparse path code includes means for examining the imagery depicting the sparse path code for pairs of features located within a predetermined pixel spacing.

13. The system of claim 9 in which the means for reading a sparse path code includes means for determining a probability value for each sparse path code feature depicted in the imagery, based on a local contrast metric computed over a region centered on the feature, and performing soft-decision decoding employing determined probability values for said features in producing said information.

14. The system of claim 9 in which the sparse path code comprises a closed-path code.

15. The system of claim 9 wherein one of said features spans an area on said item that is X microns on a side, and a pixel in said imagery spans a camera focal plane region that is Y microns on a side, wherein the ratio X/Y is less than 1, 1/2, 1/4, or 1/8.

16. The system of claim 9 in which the features are 150 microns, 120 microns, 100 microns, 75 microns, 66 microns, 50 microns, 40 microns, 33 microns, or 20 microns or less in diameter.

17. A non-transitory computer readable medium containing instructions for configuring a computer system in a plastic sorting facility to perform acts including:
  reading a sparse path code defined by features on an item, from imagery of said item on a conveyor, the sparse path code following a curved line and comprising regularly-spaced candidate marking locations along the curved line at which said features are selectively placed, the reading producing information, in which the reading a sparse path code includes extracting a bit sequence from the sparse path code, and computing a dot product between an extracted bit sequence, and each of plural candidate sequences, to produce the information by determining which of said plural candidate sequences is most likely to correspond to the extracted bit sequence;
  using produced information to determine that the item comprises an item of one plastic, sheathed in a sleeve of a second, different plastic; and
  controlling a diverter apparatus to divert the item from the conveyor into a repository that contains other sheathed items.

* * * * *